(12) United States Patent
Nagami

(10) Patent No.: US 11,137,584 B2
(45) Date of Patent: Oct. 5, 2021

(54) IMAGING LENS AND IMAGING APPARATUS

(71) Applicant: FUJIFILM Corporation, Tokyo (JP)

(72) Inventor: Ryosuke Nagami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 136 days.

(21) Appl. No.: 16/536,232

(22) Filed: Aug. 8, 2019

(65) Prior Publication Data

US 2020/0073096 A1 Mar. 5, 2020

(30) Foreign Application Priority Data

Aug. 29, 2018 (JP) .............................. JP2018-160078

(51) Int. Cl.
*G02B 15/14* (2006.01)
*G02B 9/12* (2006.01)
*G02B 13/00* (2006.01)

(52) U.S. Cl.
CPC ....... *G02B 15/143103* (2019.08); *G02B 9/12* (2013.01); *G02B 13/0015* (2013.01)

(58) Field of Classification Search
CPC .... G02B 15/143103; G02B 15/144507; G02B 15/144107; G02B 9/12; G02B 13/0015
See application file for complete search history.

(56) References Cited

U.S. PATENT DOCUMENTS

| | | |
|---|---|---|
| 2013/0148006 A1 | 6/2013 | Yoshinaga et al. |
| 2014/0139931 A1 | 5/2014 | Kubota |
| 2014/0184882 A1 | 7/2014 | Kuzuhara et al. |
| 2014/0313395 A1 | 10/2014 | Lee |
| 2020/0341238 A1* | 10/2020 | Kai .......................... G02B 9/12 |

FOREIGN PATENT DOCUMENTS

| | | |
|---|---|---|
| CN | 107390351 A | 11/2017 |
| JP | 2014-035458 A | 2/2014 |
| JP | 2014-102358 A | 6/2014 |
| JP | 2014-142604 A | 8/2014 |
| JP | 5760192 B2 | 8/2015 |
| JP | 6064422 B2 | 1/2017 |
| JP | 6090650 B2 | 3/2017 |
| JP | 2018-205527 A | 12/2018 |

OTHER PUBLICATIONS

An Office Action; "Notice of Reasons for Refusal", mailed by the Japanese Patent Office dated May 11, 2021, which corresponds to Japanese Patent Application No. 2018-160078 and is related to U.S. Appl. No. 16/536,232; with English language translation.

* cited by examiner

*Primary Examiner* — Cara E Rakowski
(74) *Attorney, Agent, or Firm* — Studebaker & Brackett PC

(57) ABSTRACT

The imaging lens consists of, in order from an object side, a positive first lens group, a positive second lens group, and a negative third lens group. During focusing, only the second lens group moves. The number of lenses included in the second lens group is two or less. The lens on the most object side is a negative lens having a convex surface toward the object side. The lens surface on the most image side is a convex surface. The first lens group includes a stop. Predetermined conditional expressions related to the first lens group and the second lens group are satisfied.

21 Claims, 11 Drawing Sheets

EXAMPLE 1

EXAMPLE 3

EXAMPLE 4

EXAMPLE 5

EXAMPLE 3

IMAGING LENS AND IMAGING APPARATUS

CROSS-REFERENCE TO RELATED APPLICATIONS

The present application claims priority under 35 U.S.C. § 119 to Japanese Patent Application No. 2018-160078, filed on Aug. 29, 2018. The above application is hereby expressly incorporated by reference, in its entirety, into the present application.

BACKGROUND OF THE INVENTION

1. Field of the Invention

The present invention relates to an imaging lens and an imaging apparatus.

2. Description of the Related Art

In the related art, as an imaging lens applicable to an imaging apparatus such as a digital camera, an inner focus lens system as disclosed in JP6090650B, JP6064422B and JP5760192B has been proposed.

SUMMARY OF THE INVENTION

The imaging lens used in the imaging apparatus is required to be capable of high-speed focusing and to be miniaturized to improve portability. In addition, the imaging lens is also required to have a secured peripheral light amount, and have a high optical performance in which various aberrations including astigmatism and distortion are favorably suppressed while having a wide angle.

However, a lens system disclosed in JP6090650B has a configuration that is disadvantageous for securing a peripheral light amount, and it cannot be said that astigmatism and distortion are sufficiently suppressed. A lens system disclosed in JP6064422B also has room for improvement in suppressing astigmatism and distortion, or in miniaturization of the lens system. In lens systems disclosed in JP5760192B, a lens system in which a lens group that moves during focusing (hereinafter referred to as a focus group) consists of three or more lenses is disadvantageous for high-speed focusing. In the other lens systems disclosed in JP5760192B, suppressing astigmatism and distortion is not sufficient, or a refractive power of the focus group is strong, so that it is difficult to suppress aberration variation during focusing.

The present disclosure has been made in consideration of the above-mentioned situation. An object to be solved by an embodiment of the present invention is to provide an imaging lens which has a configuration capable of achieving miniaturization and high-speed focusing and being advantageous for securing a peripheral light amount, and has high optical performance over the entire photographing distance in which various aberrations including astigmatism and distortion are favorably suppressed while having a wide angle, and an imaging apparatus including this imaging lens.

According to a first aspect of the present disclosure, there is provided an imaging lens consisting of, in order from an object side to an image side a first lens group having a positive refractive power; a second lens group having a positive refractive power; and a third lens group having a negative refractive power, in which during focusing from an object at infinity to a closest object, the first lens group and the third lens group are fixed with respect to an image plane and the second lens group moves along an optical axis, the first lens group consists of, in order from the object side to the image side, a first a lens group, a stop, and a first b lens group, a lens on the most object side of the first a lens group is a negative lens of which a surface on the object side is a convex surface, the number of lenses included in the second lens group is two or less, a lens surface on the most image side of the third lens group is a convex surface, and assuming that a focal length of the imaging lens in a state of focusing on the object at infinity is f, a focal length of the second lens group is f2, a focal length of the first lens group is f1, a focal length of the first a lens group is f1a, and a focal length of the first b lens group is f1b, following Conditional Expressions (1), (2) and (3) are satisfied.

$$0.35 < f/f2 < 0.75 \qquad (1)$$

$$-0.5 < f1/f1a < 0.3 \qquad (2)$$

$$0.4 < f1/f1b < 0.95 \qquad (3)$$

In the above-described imaging lens, it is preferable that at least one of following Conditional Expression (1-1), (2-1), or (3-1) is satisfied.

$$0.35 < f/f2 < 0.65 \qquad (1-1)$$

$$-0.4 < f1/f1a < 0.22 \qquad (2-1)$$

$$0.5 < f1/f1b < 0.9 \qquad (3-1)$$

In the above-described imaging lens, it is preferable that the first lens group includes at least one cemented lens obtained by cementing at least one positive lens and at least one negative lens.

It is preferable that the at least one cemented lens is disposed in the first b lens group, and the cemented lens on the most object side in the first b lens group is obtained by cementing a positive lens and a negative lens in order from the object side.

It is preferable that the first lens group includes two cemented lenses. It is preferable that the two cemented lenses are disposed in the first b lens group, the cemented lens on the most object side in the first b lens group is obtained by cementing a positive lens and a negative lens in order from the object side, and the cemented lens positioned second from the object side in the first b lens group is obtained by cementing a negative lens and a positive lens in order from the object side.

In a case where the cemented lens on the most object side in the first b lens group is obtained by cementing a positive lens and a negative lens in order from the object side, assuming that a refractive index of the positive lens composing the cemented lens on the most object side in the first b lens group with respect to a d line is N1bp, it is preferable that following Conditional Expression (4) is satisfied.

$$1.8 < N1bp < 2.1 \qquad (4)$$

In a case where the cemented lens on the most object side in the first b lens group is obtained by cementing a positive lens and a negative lens in order from the object side, assuming that an Abbe number of the positive lens composing the cemented lens on the most object side in the first b lens group based on a d line is v1bp, and an Abbe number of the negative lens composing the cemented lens on the most object side in the first b lens group based on the d line is v1bn, it is preferable that following Conditional Expression (5) is satisfied and it is more preferable that following Conditional Expression (5-1) is satisfied.

$$-50 < v1bp - v1bn < 0 \quad (5)$$

$$-40 < v1bp - v1bn < -5 \quad (5\text{-}1)$$

In a case where the first lens group includes at least one cemented lens obtained by cementing at least one positive lens and at least one negative lens, assuming that an Abbe number of the positive lens composing the cemented lens based on a d line is vp, a partial dispersion ratio between a g line and a F line of the positive lens composing the cemented lens is θgFp, an Abbe number of the negative lens composing the cemented lens based on the d line is vn, and a partial dispersion ratio between the g line and the F line of the negative lens composing the cemented lens is θgFn, it is preferable that the at least one cemented lens is obtained by cementing at least one positive lens and at least one negative lens respectively satisfying following Conditional Expressions (6) and (7).

$$0.645 < 0.0018 \times vp + \theta gFp < 0.72 \quad (6)$$

$$0.645 < 0.0018 \times vn + \theta gFn < 0.72 \quad (7)$$

In the above-described imaging lens, assuming that the focal length of the entire system is f and the focal length of the first lens group is f1, it is preferable that following Conditional Expression (8) is satisfied and it is more preferable that following Conditional Expression (8-1) is satisfied.

$$0.4 < f/f1 < 1 \quad (8)$$

$$0.5 < f/f1 < 1 \quad (8\text{-}1)$$

In the above-described imaging lens, assuming that a distance on the optical axis between a lens surface on the most object side of the first lens group and a lens surface on the most image side of the first lens group is DG1 and the focal length of the entire system in a state of focusing on the object at infinity is f, it is preferable that following Conditional Expression (9) is satisfied.

$$1.6 < DG1/f < 2.5 \quad (9)$$

In the imaging lens according to the present disclosure, assuming that the focal length of the entire system in a state of focusing on the object at infinity is f and a focal length of the third lens group is f3, it is preferable that following Conditional Expression (10) is satisfied and it is more preferable that following Conditional Expression (10-1) is satisfied.

$$-0.8 < f/f3 < -0.05 \quad (10)$$

$$-0.5 < f/f3 < -0.2 \quad (10\text{-}1)$$

In the above-described imaging lens, it is preferable that the number of lenses included in the third lens group is two or less.

In the above-described imaging lens, assuming that a sum of a distance on the optical axis from the stop to a lens surface on the most image side of the third lens group and an air equivalent distance on the optical axis from the lens surface on the most image side of the third lens group to a focus position on the image side of the imaging lens in a state of focusing on the object at infinity is DS, the focal length of the entire system in a state of focusing on the object at infinity is f, and a maximal half angle of view is ω, it is preferable that following Conditional Expression (11) is satisfied.

$$2 < DS/(f \times \tan(\omega)) < 2.85 \quad (11)$$

An imaging apparatus according to a second aspect of the present disclosure comprises the imaging lens of the above-described aspect.

In the present specification, it should be noted that the terms "consisting of ~" and "consists of ~" mean that, in addition to the components listed, a lens that substantially has no refractive power, an optical element, which is not a lens, such as a stop, a filter, and a cover glass, and a mechanism part such as a lens flange, a lens barrel, an imaging element, and a camera shaking correction mechanism may be included.

In the present specification, it should be noted that the term "~group having a positive refractive power" means that the group has a positive refractive power as a whole. Likewise, it should be also noted that the term "~group having a negative refractive power" means that the group has a negative refractive power as a whole. The term "lens having a positive refractive power" and the term "positive lens" are synonymous. The term "lens having a negative refractive power" and the term "negative lens" are synonymous. The "lens group" is not limited to a composition consisting of a plurality of lenses, and may be a composition of only one lens.

The term "single lens" means one lens that is not cemented with any other lens. However, a compound aspheric lens (a lens which is integrally composed of a spherical lens and a film having an aspheric shape formed on the spherical lens, and functions as one aspheric lens as a whole) is not be considered as a cemented lens, and is treated as a single lens. The sign of the refractive power and the surface shape of the lens surface of a lens including an aspheric surface are considered in terms of the paraxial region unless otherwise noted.

The "focal length" used in conditional expressions is a paraxial focal length. Values used in the conditional expressions are values in a case where the d line is used as a reference except for the partial dispersion ratio. It should be noted that the partial dispersion ratio θgF between the g line and the F line of a certain lens is defined by θgF=(Ng−NF)/(NF−NC), where Ng, NF, and NC are the refractive indices of the lens at the g line, the F line, and the C line, respectively. The "d line", "C line", "F line", and "g line" described in this specification are bright lines, the wavelength of the d line is 587.56 nm (nanometer), the wavelength of the C line is 656.27 nm (nanometer), the wavelength of the F line is 486.13 nm (nanometer), and the wavelength of the g line is 435.84 nm (nanometer).

According to an embodiment of the present invention, it is possible to provide an imaging lens which has a configuration capable of achieving miniaturization and high-speed focusing and being advantageous for securing a peripheral light amount, and has high optical performance over the entire photographing distance in which various aberrations including astigmatism and distortion are favorably suppressed while having a wide angle, and an imaging apparatus including this imaging lens.

DESCRIPTION OF THE PREFERRED EMBODIMENTS

Figure 1:
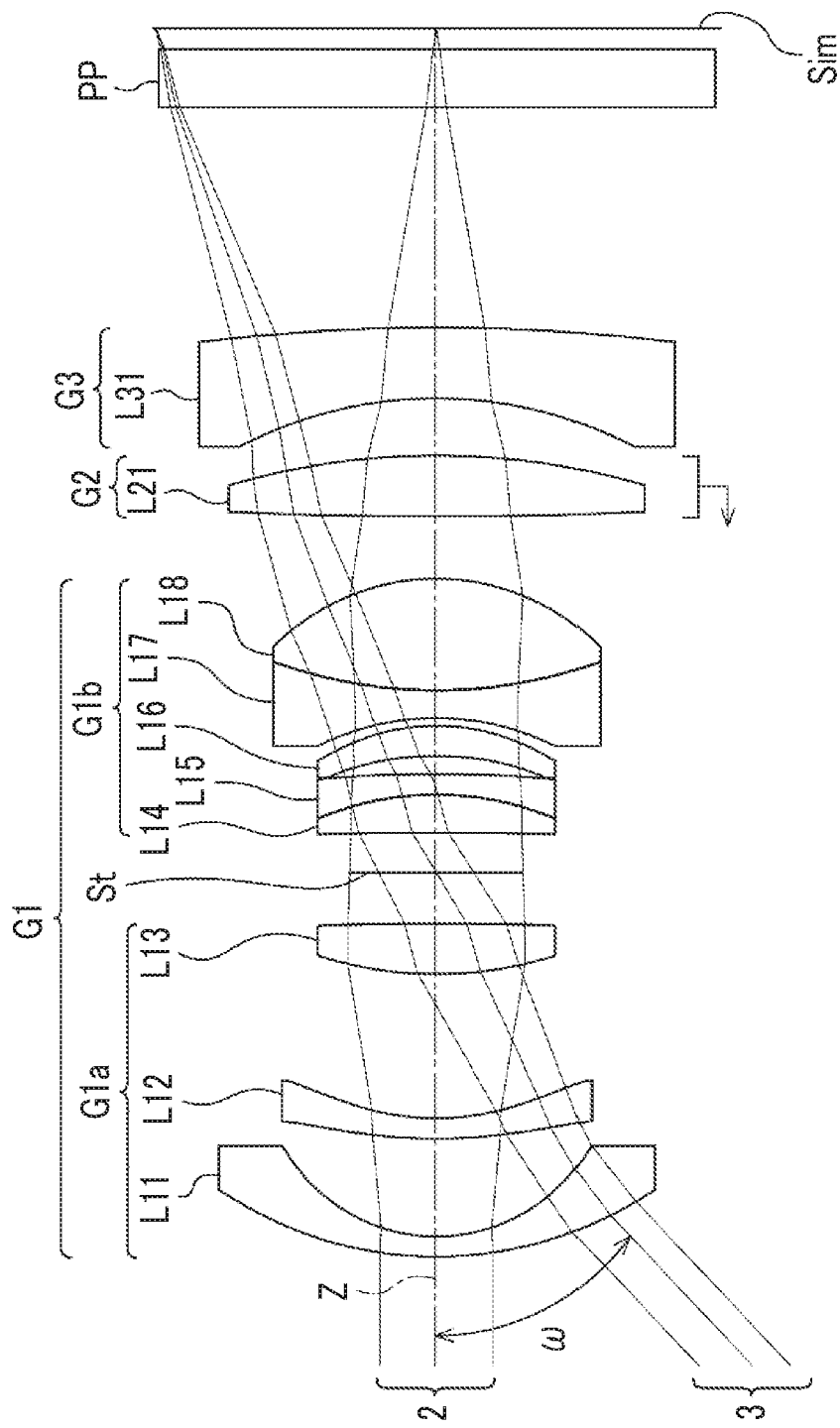
FIG. 1 is a cross-sectional view illustrating a configuration of an imaging lens according to an embodiment of the present invention which corresponds to an imaging lens of Example 1 of the present invention.

Hereinafter, embodiments of an imaging lens of the present disclosure will be described in detail with reference to the drawings. FIG. 1 is a cross-sectional view illustrating a configuration of an imaging lens according to an embodiment of the present invention. The example shown in FIG. 1 corresponds to an imaging lens of Example 1 to be described later. In FIG. 1, the left side is the object side, the right side is the image side, and a state of focusing on an object at infinity is shown. In addition, an on-axis light flux 2 and a light flux 3 of the maximal angle of view are also shown as the light flux in FIG. 1.

In FIG. 1, an example is illustrated in which a parallel-plate optical member PP is disposed between an imaging lens and an image plane Sim on the assumption that the imaging lens is applied to the imaging apparatus. The optical member PP is a member assuming various filters, and/or a cover glass or the like. The various filters are, for example, a low pass filter, an infrared ray cut filter, and a filter that cuts a specific wavelength range. The optical member PP is a member having no refractive power, and a configuration in which the optical member PP is omitted is also possible.

The imaging lens consists of, in order from an object side to an image side along an optical axis Z, a first lens group G1 having a positive refractive power, a second lens group G2 having a positive refractive power, and a third lens group G3 having a negative refractive power. The first lens group G1 includes an aperture stop St inside. The first lens group G1 consists of, in order from the object side to the image side, a first a lens group G1a, the aperture stop St, and a first b lens group G1b.

As an example, the imaging lens shown in FIG. 1 consists of the first a lens group G1a, the first b lens group G1b, the second lens group G2, and the third lens group G3. The first a lens group G1a consists of three lenses L11 to L13, in order from the object side to the image side, and the first b lens group G1b consists of five lenses L14 to L18, in order from the object side to the image side. The second lens group G2 consists of one lens L21, and the third lens group G3 consists of one lens L31. However, as shown in the examples to be described later, the number of lenses of which each lens group consists can be different from the number shown in FIG. 1. The aperture stop St shown in FIG. 1 does not indicate a shape thereof and indicates a position thereof on the optical axis Z.

In the imaging lens according to the embodiment of the present disclosure, during focusing from the object at infinity to a closest object, the first lens group G1 and the third lens group G3 are fixed with respect to the image plane Sim, and the second lens group G2 moves along the optical axis Z. That is, the focus group is the second lens group G2. In the example shown in FIG. 1, the second lens group G2 moves to the object side during focusing from the object at infinity to the closest object. An arrow directed to the left under the second lens group G2 shown in FIG. 1 indicates that the second lens group G2 is the focus group that moves to the object side during focusing from the object at infinity to the closest object.

With the configuration in which only the second lens group G2 moves during focusing, miniaturization and weight reduction of the focus unit which moves during focusing can be achieved, which is advantageous for speeding up focusing. Further, this configuration can contribute to miniaturization of the lens system and to miniaturization and weight reduction of the imaging apparatus.

Since the first lens group G1 has a positive refractive power, the light flux emitted from the first lens group G1 is converged to be incident on the second lens group G2, and thus the diameter of the second lens group G2 that is the focus group can be reduced. As a result, the miniaturization and weight reduction of the focus group can be achieved, which is advantageous for speeding up focusing.

Since the third lens group G3 has a negative refractive power, the positive refractive power of the second lens group G2 can be strengthened, and thus the configuration can contribute to shortening a movement amount of the focus group during focusing and speeding up focusing. Further, by making the arrangement of the refractive powers of the three lens groups positive, positive, and negative in order from the object side to the image side, a telephoto type configuration is obtained, which is advantageous for shortening the overall length of the lens system.

The lens on the most object side of the first a lens group G1a is configured to be a negative lens of which the object-side surface is a convex surface. Further, the lens surface on the most image side of the third lens group G3 is configured to be a convex surface.

With the configuration in which the lens on the most object side is a negative lens, an entrance pupil can come closer to the object side, which can contribute to securing a wide angle of view and reducing the diameter. With the configuration in which the lens on the most object side is a negative meniscus lens having a convex surface toward the object side, it is advantageous for suppressing astigmatism and distortion, and also advantageous for securing a peripheral light amount. A configuration in which a negative lens is disposed on the most object side of the first lens group G1, the sign of the refractive power of the entire first lens group G1 is positive, the sign of the refractive power of the entire second lens group G2 is positive, and the sign of the refractive power of the entire third lens group G3 is negative is a lens system having high symmetry, which is advantageous for favorably correcting distortion, field curvature, lateral chromatic aberration, and the like. Furthermore, with a configuration in which a lens surface on the most object side of the imaging lens and a lens surface on the most image side of the imaging lens are convex surfaces, it is possible to increase symmetry of the lens system and more favorably correct the off-axis aberration. Further, with a configuration in which a lens surface on the most image side of the third lens group G3 is a convex surface, it is advantageous for suppressing the astigmatism and the distortion, and advantageous for reducing an incidence angle of principal light rays of the off-axis light flux on the image plane Sim.

The number of lenses included in the second lens group G2 is configured to be two or less. This configuration can contribute to miniaturization and weight reduction of the lens system, and miniaturization and weight reduction of the focus unit can be achieved.

The imaging lens system is configured to satisfy following Conditional Expression (1) assuming that the focal length of the entire system in a state of focusing on the object at infinity is f and the focal length of the second lens group G2 is f2. By not allowing the result of Conditional Expression (1) to be equal to or less than the lower limit, it is possible to shorten the movement amount of the focus group at the time of focusing, which is advantageous for shortening the overall length of the lens system. By not allowing the result of Conditional Expression (1) to be equal to or greater than the upper limit, the refractive power of the second lens group G2 does not become excessively strong, and thus it becomes easy to suppress the amount of aberration variation at the time of focusing, which is advantageous for maintaining high optical performance over the entire photographing distance. Furthermore, in a case of a configuration in which following Conditional Expression (1-1) is satisfied, it is possible to obtain more favorable characteristics.

$$0.35 < f/f2 < 0.75 \tag{1}$$

$$0.35 < f/f2 < 0.65 \tag{1-1}$$

The imaging lens is configured to satisfy following Conditional Expression (2) assuming that the focal length of the first lens group G1 is f1 and the focal length of the first a lens group G1a is f1a. Since the aperture stop St is disposed adjacent to the image side of the first a lens group G1a, by not allowing the result of Conditional Expression (2) to be equal to or less than the lower limit, it is possible to suppress the increase of the opening diameter of the aperture stop St, which is advantageous for reducing the diameter of the lens. By not allowing the result of Conditional Expression (2) to be equal to or greater than the upper limit, it becomes easy to secure the back focus. Furthermore, in a case of a configuration in which following Conditional Expression (2-1) is satisfied, it is possible to obtain more favorable characteristics.

$$-0.5 < f1/f1a < 0.3 \tag{2}$$

$$-0.4 < f1/f1a < 0.22 \tag{2-1}$$

The imaging lens is configured to satisfy following Conditional Expression (3) assuming that the focal length of the first lens group G1 is f1 and the focal length of the first b lens group G1b is f1b. By not allowing the result of Conditional Expression (3) to be equal to or less than the lower limit, it becomes easy to secure the back focus. By not allowing the result of Conditional Expression (3) to be equal to or greater than the upper limit, it is possible to suppress the increase of the lens diameter of the second lens group G2. Furthermore, in a case of a configuration in which following Conditional Expression (3-1) is satisfied, it is possible to obtain more favorable characteristics.

$$0.4 < f1/f1b < 0.95 \tag{3}$$

$$0.5 < f1/f1b < 0.9 \tag{3-1}$$

By simultaneously satisfying above Conditional Expressions (1), (2), and (3), it is possible to suitably set the distribution of the refractive power in the first lens group G1 while maintaining the refractive power of the focus group in an appropriate range. As a result, it is possible to simultaneously facilitate suppression of aberration variation at the time of focusing and securing of the back focus.

Next, preferable configurations and available configurations of the imaging lens of the present disclosure will be described. It is preferable that the first lens group G1 includes at least one cemented lens obtained by cementing at least one positive lens and at least one negative lens. In this case, it is advantageous for correcting chromatic aberration. Since the second lens group G2 is composed of a small number of lenses and focusing is performed using only the second lens group G2, it is important that the chromatic aberration is suppressed by the first lens group G1 alone, and for that purpose, it is preferable for the first lens group G1 to include the cemented lens.

In a case where the first lens group G1 includes the cemented lens, it is preferable that at least one cemented lens is obtained by cementing at least one positive lens satisfying following Conditional Expression (6) and at least one negative lens satisfying following Conditional Expressions (7) assuming that the Abbe number of the positive lens composing the cemented lens based on the d line is vp, a partial dispersion ratio between the g line and the F line of the positive lens composing the cemented lens is θgFp, the Abbe number of the negative lens composing the cemented lens based on the d line is vn, and a partial dispersion ratio between the g line and the F line of the negative lens composing the cemented lens is θgFn. By simultaneously satisfying Conditional Expressions (6) and (7), it becomes easy to correct the secondary spectrum of chromatic aberration.

$$0.645 < 0.0018 \times vp + \theta gFp < 0.72 \tag{6}$$

$$0.645 < 0.0018 \times vn + \theta gFn < 0.72 \tag{7}$$

In a case where the first lens group G1 includes the cemented lens, it is preferable that at least one cemented lens is disposed in the first b lens group G1b and the cemented lens on the most object side in the first b lens group G1b is obtained by cementing a positive lens and a negative lens in order from the object side. Since the cemented lens on the most object side in the first b lens group G1b is positioned near the aperture stop St, the lens diameter can be reduced. Furthermore, by disposing the positive lens on the most object side of the cemented lens, the diameter of the entire cemented lens can also be reduced, which is advantageous for reducing a diameter.

In a case where the first b lens group G1b includes the cemented lens and the cemented lens on the most object side in the first b lens group G1b is obtained by cementing a positive lens and a negative lens in order from the object side, it is preferable that following Conditional Expression (4) is satisfied assuming that a refractive index of the positive lens composing the cemented lens on the most object side in the first b lens group G1b at the d line is N1bp. By not allowing the result of Conditional Expression (4) to be equal to or less than the lower limit, it is advantageous for miniaturization. By not allowing the result of Conditional Expression (4) to be equal to or greater than the upper limit, the dispersion of a material does not become too large, which is advantageous for correcting chromatic aberration.

$$1.8 < N1bp < 2.1 \tag{4}$$

In a case where the first b lens group G1b includes the cemented lens and the cemented lens on the most object side in the first b lens group G1b is obtained by cementing a positive lens and a negative lens in order from the object side, it is preferable that following Conditional Expression (5) is satisfied assuming that the Abbe number of the positive lens composing the cemented lens on the most object side in the first b lens group G1b based on the d line is ν1bp, the Abbe number of the negative lens composing the cemented lens on the most object side in the first b lens group G1b based on the d line is ν1bn. By not allowing the result of Conditional Expression (5) to be equal to or less than the lower limit, it becomes easy to correct longitudinal chromatic aberration. By not allowing the result of Conditional Expression (5) to be equal to or greater than the upper limit, it becomes easy to correct lateral chromatic aberration. That is, by satisfying Conditional Expression (5), it becomes easy to correct chromatic aberration. Furthermore, in a case of a configuration in which following Conditional Expression (5-1) is satisfied, it is possible to obtain more favorable characteristics.

$$-50 < \nu 1bp - \nu 1bn < 0 \qquad (5)$$

$$-40 < \nu 1bp - \nu 1bn < -5 \qquad (5\text{-}1)$$

It is preferable that the first lens group G1 includes at least two cemented lenses each obtained by cementing at least one positive lens and at least one negative lens. In this case, it is more advantageous for correcting chromatic aberration. These two cemented lenses are preferably disposed in the first b lens group G1b. It is preferable that the cemented lens on the most object side in the first b lens group G1b is obtained by cementing a positive lens and a negative lens in order from the object side and the second cemented lens from the object side in the first b lens group G1b is obtained by cementing a negative lens and a positive lens in order from the object side. With this configuration, the arrangement of refractive powers of the lenses composing the two cemented lenses becomes positive, negative, negative, and positive in order from the object side to the image side, which is advantageous for correcting field curvature.

Further, it is preferable that following Conditional Expression (8) is satisfied assuming that the focal length of the entire system in a state of focusing on the object at infinity is f and the focal length of the first lens group G1 is f1. By not allowing the result of Conditional Expression (8) to be equal to or less than the lower limit, it is possible to suppress an increase of the lens diameter of the second lens group G2 following the first lens group G1 and to achieve miniaturization and weight reduction of the focus group, which is advantageous for speeding up focusing. By not allowing the result of Conditional Expression (8) to be equal to or greater than the upper limit, it is possible to secure the refractive power of the second lens group G2 following the first lens group G1, which is advantageous for shortening the movement amount of the focus group at the time of focusing. Furthermore, in a case of a configuration in which following Conditional Expression (8-1) is satisfied, it is possible to obtain more favorable characteristics.

$$0.4 \leq f/f1 < 1 \qquad (8)$$

$$0.5 \leq f/f1 < 1 \qquad (8\text{-}1)$$

It is preferable that following Conditional Expression (9) is satisfied assuming that a distance on the optical axis between a lens surface on the most object side of the first lens group G1 and a lens surface on the most image side of the first lens group G1 is DG1 and the focal length of the entire system in a state of focusing on the object at infinity is f. By not allowing the result of Conditional Expression (9) to be equal to or less than the lower limit, it becomes easy to balance spherical aberration and astigmatism in the first lens group G1. In addition, it becomes easy to suppress the amount of aberration variation at the time of focusing. By not allowing the result of Conditional Expression (9) to be equal to or greater than the upper limit, it is advantageous for miniaturization of the lens system. Furthermore, in a case of a configuration in which following Conditional Expression (9-1) is satisfied, it is possible to obtain more favorable characteristics.

$$1.6 < DG1/f < 2.5 \qquad (9)$$

$$1.8 < DG1/f < 2.2 \qquad (9\text{-}1)$$

It is preferable that following Conditional Expression (10) is satisfied assuming that the focal length of the entire system in a state of focusing on the object at infinity is f and the focal length of the third lens group G3 is f3. By not allowing the result of Conditional Expression (10) to be equal to or less than the lower limit, it is possible to suppress the refractive power of the second lens group G2 and it becomes easy to suppress the amount of aberration variation at the time of focusing. By not allowing the result of Conditional Expression (10) to be equal to or greater than the upper limit, it becomes easy to correct field curvature. Furthermore, in a case of a configuration in which following Conditional Expression (10-1) is satisfied, it is possible to obtain more favorable characteristics.

$$-0.8 \leq f/f3 < -0.05 \qquad (10)$$

$$0.5 \leq f/f3 < -0.2 \qquad (10\text{-}1)$$

It is preferable that following Conditional Expression (11) is satisfied assuming that a sum of a distance on the optical axis from the aperture stop St to the lens surface on the most image side of the third lens group G3 and an air equivalent distance on the optical axis from the lens surface on the most image side of the third lens group G3 to a focus position on the image side of the entire system in a state of focusing on the object at infinity is DS, the focal length of the entire system in a state of focusing on the object at infinity is f, and a maximal half angle of view is ω. By not allowing the result of Conditional Expression (11) to be equal to or less than the lower limit, it becomes easy to make the incidence angle of principal light rays of the off-axis light flux on the image plane Sim within an appropriate range. By not allowing the result of Conditional Expression (11) to be equal to or greater than the upper limit, it is advantageous for miniaturization.

$$2 < DS/(f \times \tan(w)) < 2.85 \qquad (11)$$

It is preferable that following Conditional Expression (12) is satisfied assuming that a sum of a distance on the optical axis from the lens surface on the most object side of the first lens group G1 to the lens surface on the most image side of the third lens group G3 and an air equivalent distance on the optical axis from the lens surface on the most image side of the third lens group G3 to a focus position on the image side of the entire system in a state of focusing on the object at infinity is TL, the focal length of the entire system in a state of focusing on the object at infinity is f, and a maximal half angle of view is ω. By not allowing the result of Conditional Expression (12) to be equal to or less than the lower limit, it becomes easy to correct field curvature and distortion. By not allowing the result of Conditional Expression (12) to be equal to or greater than the upper limit, it is advantageous for shortening the overall length of the lens system and for reducing the diameter of the lens system. That is, by satisfying Conditional Expression (12), it becomes easy to achieve both miniaturization and favorable correction of aberration.

$$3<TL/(f\times\tan(\omega))<4.5 \qquad (12)$$

It is preferable that following Conditional Expression (13) is satisfied assuming that an air equivalent distance on the optical axis from the lens surface on the most image side of the third lens group G3 to a focus position on the image side of the entire system in a state of focusing on the object at infinity is Bf, the focal length of the entire system in a state of focusing on the object at infinity is f, and a maximal half angle of view is ω. By not allowing the result of Conditional Expression (13) to be equal to or less than the lower limit, a lens on the most image side does not approach the image plane Sim too much, which is advantageous for reducing the lens diameter. By not allowing the result of Conditional Expression (13) to be equal to or greater than the upper limit, it is advantageous for shortening the overall length of the lens system.

$$0.8<Bf/(f\times\tan(\omega))<1.1 \qquad (13)$$

Specifically, for example, each lens group can adopt configurations described below. The first a lens group G1*a* may be configured to consist of two negative lenses and one positive lens. More specifically, the first a lens group G1*a* may be configured to consist of, in order from the object side to the image side, two negative meniscus lenses each of which the surface on the object side is a convex surface, and one positive lens of which the surface on the object side is a convex surface. In a case where the first a lens group G1*a* consists of the above-described three lenses, all the three lenses may be a single lens that is not cemented.

The first b lens group G1*b* may be configured to consist of, in order from the object side to the image side, a first cemented lens obtained by cementing a positive lens and a negative lens, a positive lens that is a single lens, and a second cemented lens obtained by cementing a negative lens and a positive lens. The cemented surface of the first cemented lens may have a convex surface toward the image side. In such a case, the incidence angle of the principal light ray of the peripheral angle of view on the cemented surface can be reduced, which is advantageous for suppressing the occurrence of astigmatism. Further, the cemented surface of the second cemented lens may have a convex surface toward the object side. In such a case, it is advantageous for correcting lateral chromatic aberration. The positive lens disposed between the first cemented lens and the second cemented lens is a meniscus lens having a convex surface toward the image side, and a surface on the object side of the negative lens of the second cemented lens may be configured to be a concave surface. In such a case, it is advantageous for miniaturization.

The second lens group G2 can be configured to consist of one or two lenses. In a case where the number of lenses included in the second lens group G2 is only one, it is more advantageous for miniaturization. The second lens group G2 may be configured to consist of a single biconvex lens. In such a case, the second lens group G2 can have a strong refractive power, which is advantageous for miniaturization and speeding up focusing. Alternatively, the second lens group G2 may be configured to consist of a cemented lens obtained by cementing a negative lens and a positive lens. In such a case, it is advantageous for miniaturization and for suppressing variation of chromatic aberration at the time of focusing.

It is preferable that the number of lenses included in the third lens group G3 is two or less. In such a case, it is advantageous for miniaturization. In a case where the number of lenses included in the third lens group G3 is only one, it is more advantageous for miniaturization. The third lens group G3 may be configured to consist of one negative meniscus lens of which the surface on the image side is a convex surface. Alternatively, the third lens group G3 may be configured to consist of two negative meniscus lenses each of which the surface on the image side is a convex surface.

The above-mentioned preferable configurations and available configurations may be optionally combined, and it is preferable to selectively adopt the configurations in accordance with the required specification as appropriate. With the technology of the present disclosure, it is possible to realize an imaging lens which has a configuration capable of achieving miniaturization and high-speed focusing and being advantageous for securing a peripheral light amount, and has high optical performance over the entire photographing distance in which various aberrations including astigmatism and distortion are favorably suppressed while the imaging lens has a wide angle. Herein, the term "wide angle" means that the total angle of view is 80 degrees or more.

Next, numerical examples of the imaging lens of the embodiment of the present invention will be described.

EXAMPLE 1

A cross-sectional view illustrating the configuration of an imaging lens of Example 1 is shown in FIG. 1, and since the illustration method and the configuration thereof are as described above, part of redundant explanation will be omitted herein. The imaging lens of Example 1 consists of, in order from the object side to the image side, a first lens group G1 that has a positive refractive power, a second lens group G2 that has a positive refractive power, and a third lens group G3 that has a negative refractive power. During focusing from the object at infinity to a closest object, the first lens group G1 and the third lens group G3 are fixed with respect to the image plane Sim, and only the second lens group G2 moves to the object side along the optical axis Z. The first lens group G1 consists of, in order from the object side to the image side, a first a lens group G1*a*, an aperture stop St, and a first b lens group G1*b*. The first a lens group G1*a* consists of three lenses L11 to L13 in order from the object side to the image side. The first b lens group G1*b* consists of five lenses L14 to L18 in order from the object side to the image side. The lens L14 and the lens L15 are cemented with each other. The lens L17 and the lens L18 are cemented with each other. The second lens group G2 consists of only one lens L21. The third lens group G3 consists of only one lens L31. The above is the outline of the imaging lens of Example 1.

Regarding the imaging lens of Example 1, Table 1 shows basic lens data, Table 2 shows specifications, Table 3 shows variable surface distances, and Table 4 shows aspherical coefficients. In Table 1, the column of Sn shows surface numbers, where the surface on the most object side is the first surface and the surface number increases one by one toward the image side. The column of R shows radii of curvature of the respective surfaces. The column of D shows surface distances on the optical axis between each surface and the adjacent surface on the image side. Further, the column of Nd shows refractive indices of the respective components at the d line, the column of νd shows Abbe numbers of the respective components based on the d line, and the column of θgF shows partial dispersion ratio of respective components between the g line and the F line.

In Table 1, the reference sign of a radius of curvature of the surface having a shape convex toward the object side is set to be positive, and the reference sign of the radius of curvature of the surface having a shape convex toward the image side is set to be negative. In Table 1, the aperture stop St is also illustrated, and the surface number and a term of (St) are noted in a place of the surface number of a surface corresponding to the aperture stop St. A value in the bottom of the column of D in Table 1 indicates a distance between the image plane Sim and the surface on the most image side in the table. In Table 1, the symbol DD [ ] is used for a variable surface distance in which the distance changes during focusing, and the surface number of the object side of this distance is added in [ ] and noted in the column of D.

In Table 2, values of the focal length f of the imaging lens, the back focus Bf in terms of the air equivalent distance, the F number FNo., and the maximal total angle of view 2ω are shown based on the d line. (°) in the place of 2ω indicates that the unit thereof is a degree. The values shown in Table 2 are values based on the d line in a state of focusing on the object at infinity.

In Table 3, values of the variable surface distance in a state of focusing on the object at infinity and values of the variable surface distance in a state of focusing on an object at a distance of 1 m (meter) are respectively shown in the columns of "infinity" and "1 m".

In Table 1, the reference sign * is attached to the surface number of the aspheric surface, and the numerical value of the paraxial radius of curvature is written in the column of the radius of curvature of the aspheric surface. In Table 4, the row of Sn shows the surface number of the aspheric surface, and the rows of KA and Am (m=4, 6, 8, 10) show the numerical values of the aspherical coefficients for each aspheric surface. The "E±n" (n: an integer) in numerical values of the aspherical coefficients of Table 4 indicates "×10$^{\pm n}$". KA and Am are the aspherical coefficients in the aspheric expression represented by following expression.

$$Zd = C \times h^2 / \{1 + (1 - KA \times C^2 \times h^2)^{1/2}\} + \Sigma Am \times h^m$$

where Zd is an aspheric depth (the length of a perpendicular drawn to a plane perpendicular to the optical axis with which the aspherical vertex contacts, from a point on the aspherical surface of the height h), h is a height (the distance from the optical axis to the lens surface), C is an inverse of the paraxial radius of curvature, KA and Am are aspherical coefficients, and Σ in an aspheric expression means the sum with respect to m.

In data of each table, a degree is used as a unit of an angle, and mm (millimeter) is used as a unit of a length, but appropriate different units may be used since the optical system can be used even in a case where the system is enlarged or suppressed in proportion. Further, each of following tables shows numerical values rounded off to predetermined decimal places.

TABLE 1

| | | Example 1 | | | |
|---|---|---|---|---|---|
| Sn | R | D | Nd | νd | θgF |
| 1 | 19.985 | 0.99 | 1.52249 | 59.83 | 0.54398 |
| 2 | 9.049 | 4.82 | | | |
| *3 | 26.709 | 1.00 | 1.51633 | 64.06 | 0.53345 |
| *4 | 12.660 | 7.05 | | | |
| 5 | 20.294 | 2.49 | 1.77250 | 49.60 | 0.55212 |
| 6 | −159.552 | 2.49 | | | |
| 7 (St) | ∞ | 1.99 | | | |
| 8 | −180.166 | 1.87 | 2.00069 | 25.46 | 0.61364 |
| 9 | −15.738 | 1.00 | 1.67300 | 38.26 | 0.57580 |
| 10 | −72.853 | 0.89 | | | |
| *11 | −17.452 | 1.49 | 1.58313 | 59.38 | 0.54237 |
| *12 | −11.035 | 0.39 | | | |
| 13 | −13.674 | 1.36 | 1.80518 | 25.42 | 0.61616 |
| 14 | 24.921 | 5.49 | 1.59522 | 67.73 | 0.54426 |
| 15 | −11.886 | DD[15] | | | |
| 16 | 234.089 | 3.00 | 1.81600 | 46.62 | 0.55682 |
| 17 | −38.338 | DD[17] | | | |
| 18 | −21.997 | 3.42 | 1.62588 | 35.70 | 0.58935 |
| 19 | −100.885 | 10.86 | | | |
| 20 | ∞ | 2.85 | 1.51633 | 64.14 | 0.53531 |
| 21 | ∞ | 1.03 | | | |

TABLE 2

| Example 1 | |
|---|---|
| f | 16.31 |
| Bf | 13.77 |
| FNo. | 2.85 |
| 2ω(°) | 88.2 |

TABLE 3

| Example 1 | | |
|---|---|---|
| | Infinity | 1 m |
| DD[15] | 3.07 | 2.83 |
| DD[17] | 2.82 | 3.06 |

TABLE 4

| Example 1 | | | | |
|---|---|---|---|---|
| Sn | 3 | 4 | 11 | 12 |
| KA | 1.0000000E+00 | 1.0000000E+00 | 1.0000000E+00 | 1.0000000E+00 |
| A4 | −9.2633281E−05 | −1.5412787E−04 | −2.0396420E−04 | 1.0356481E−05 |
| A6 | 1.0592633E−06 | 7.7711815E−07 | −5.6370966E−07 | −1.0153860E−06 |
| A8 | −1.9635288E−08 | −3.8164057E−08 | −2.1011674E−08 | 5.1433658E−09 |
| A10 | 1.0001805E−10 | 2.0686376E−10 | 1.5358790E−09 | 1.3335325E−09 |

Figure 6:
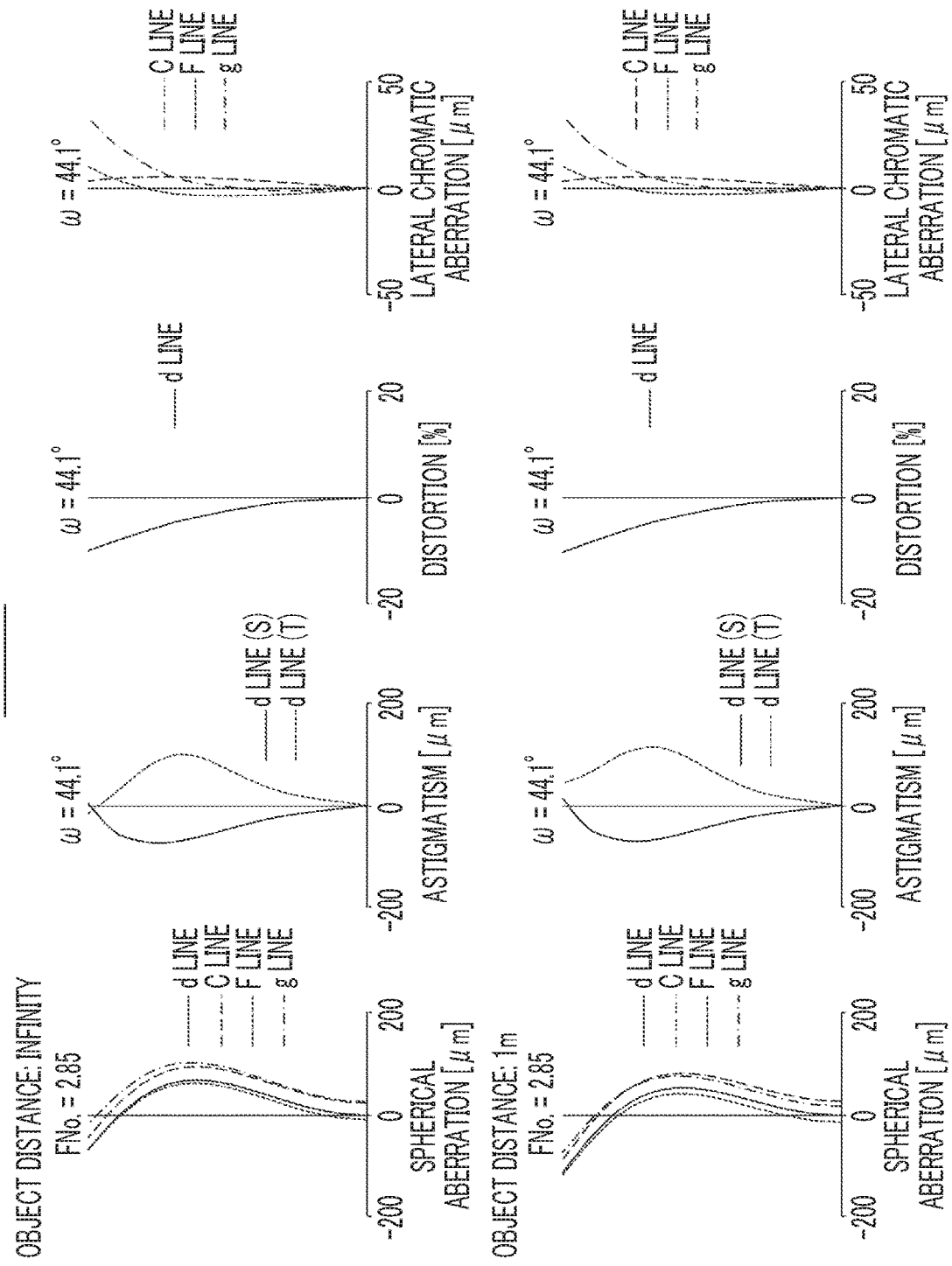
FIG. 6 is aberration diagrams of the imaging lens of Example 1 of the present invention.

Each aberration diagram of the imaging lens of Example 1 is shown in FIG. 6. FIG. 6 shows spherical aberration, astigmatism, distortion, and lateral chromatic aberration in order from the left side. In FIG. 6, aberration diagrams in a state of focusing on the object at infinity are shown in the upper row with "object distance: infinity", and aberration diagrams in a state of focusing on an object at a distance of 1 m (meter) are shown in the lower row with "object distance: 1 m". In the spherical aberration diagram, aberrations at the d line, the C line, the F line, and the g line are respectively indicated by a solid line, a long dashed line, a short dashed line, and a dash-dotted line. In the astigmatism diagram, aberration in the sagittal direction at the d line is indicated by a solid line, and aberration in the tangential direction at the d line is indicated by a short dashed line. In the distortion diagram, aberration at the d line is indicated by a solid line. In the lateral chromatic aberration diagram, aberrations at the C line, the F line, and the g line are respectively indicated by a long dashed line, a short dashed line, and a dash-dotted line. In the spherical aberration diagram, FNo. indicates an F number and in other aberration diagrams, ω indicates maximal half angle of view.

The symbols, the meanings, the description method, and the illustration method of each data item relating to Example 1 are the same in following Examples unless otherwise specified, and thus descriptions thereof will not be repeated below.

EXAMPLE 2

Figure 2:
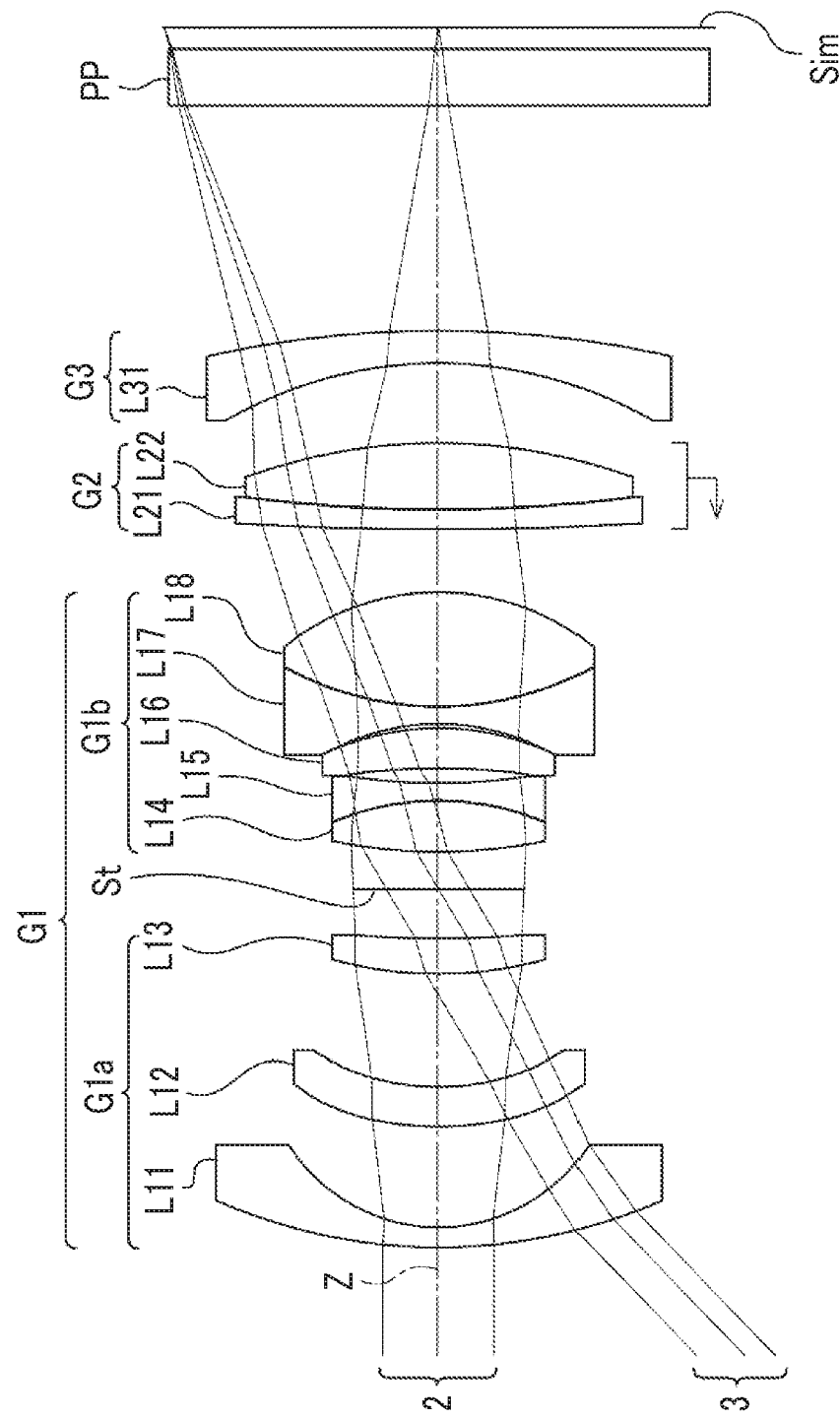
FIG. 2 is a cross-sectional view illustrating a configuration of an imaging lens of Example 2 of the present invention.
Figure 7:
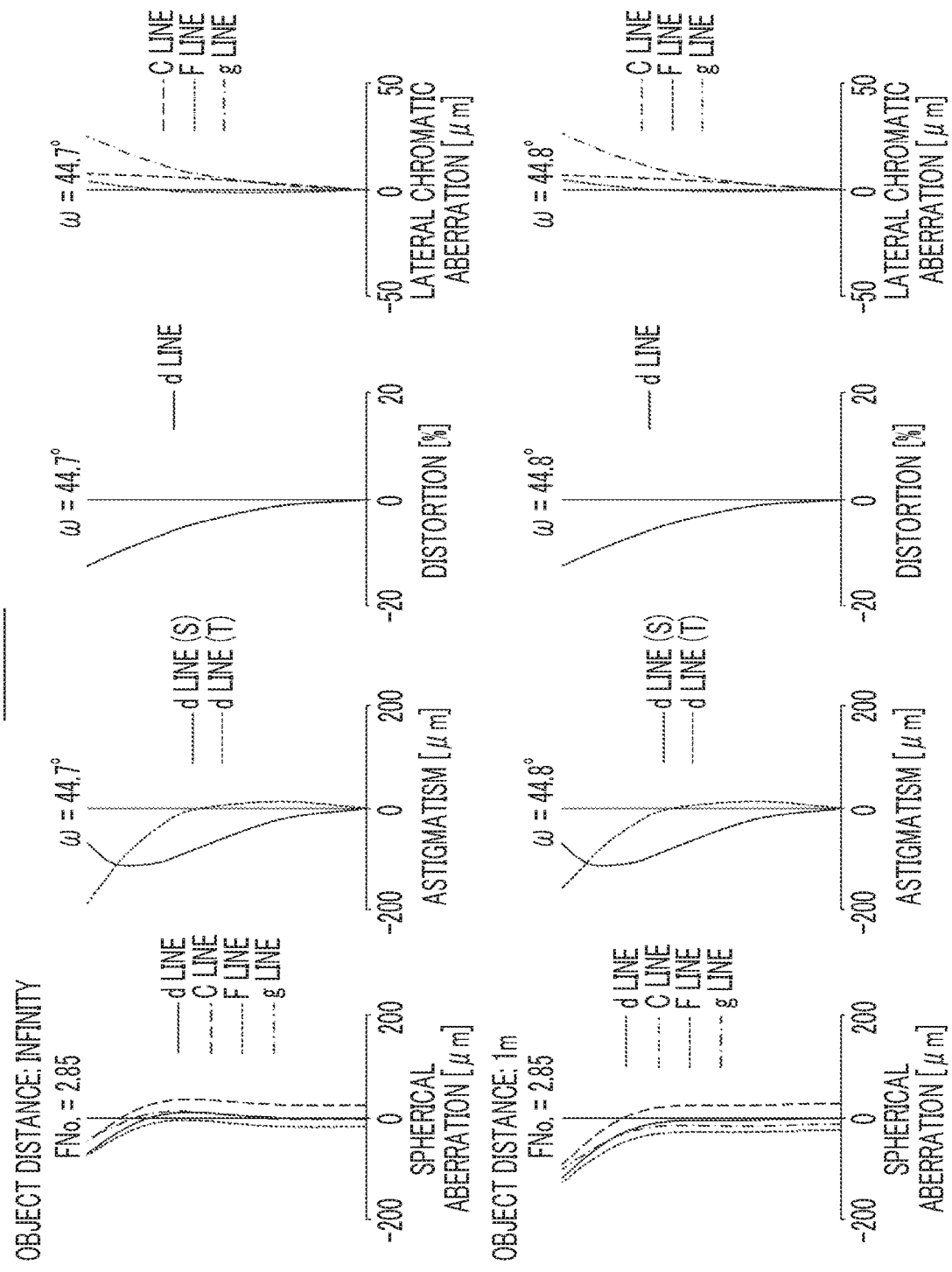
FIG. 7 is aberration diagrams of the imaging lens of Example 2 of the present invention.

FIG. 2 is a cross-sectional view illustrating a configuration of an imaging lens of Example 2. The imaging lens of Example 2 has the same configuration as the outline of the imaging lens of Example 1 except that the second lens group G2 consists of two lenses L21 and L22 in order from the object side to the image side. Regarding the imaging lens of Example 2, Table 5 shows basic lens data, Table 6 shows specifications, Table 7 shows variable surface distances, Table 8 shows aspherical coefficients, and FIG. 7 shows each aberration diagram. In FIG. 7, aberration diagrams in a state of focusing on the object at infinity are shown in the upper row, and aberration diagrams in a state of focusing on an object at a distance of 1 m (meter) are shown in the lower row.

TABLE 5-continued

Example 2

| Sn | R | D | Nd | vd | θgF |
|---|---|---|---|---|---|
| 7 (St) | ∞ | 1.87 | | | |
| 8 | 28.604 | 2.57 | 2.00069 | 25.46 | 0.61364 |
| 9 | −14.499 | 0.88 | 1.72047 | 34.71 | 0.58350 |
| 10 | 31.075 | 0.73 | | | |
| *11 | −42.495 | 2.04 | 1.58313 | 59.38 | 0.54237 |
| *12 | −13.722 | 0.21 | | | |
| 13 | −12.324 | 0.87 | 1.80518 | 25.42 | 0.61616 |
| 14 | 16.921 | 5.77 | 1.65160 | 58.55 | 0.54267 |
| 15 | −12.943 | DD[15] | | | |
| 16 | 179.998 | 0.99 | 1.81600 | 46.62 | 0.55682 |
| 17 | 80.003 | 3.35 | 1.74100 | 52.64 | 0.54676 |
| 18 | −29.922 | DD[18] | | | |
| 19 | −22.440 | 1.59 | 1.80518 | 25.42 | 0.61616 |
| 20 | −55.821 | 11.32 | | | |
| 21 | ∞ | 2.85 | 1.51633 | 64.14 | 0.53531 |
| 22 | ∞ | 1.09 | | | |

TABLE 6

Example 2

| f | 16.39 |
|---|---|
| Bf | 14.29 |
| FNo. | 2.85 |
| 2ω(°) | 89.4 |

TABLE 7

Example 2

| | Infinity | 1 m |
|---|---|---|
| DD[15] | 3.16 | 2.94 |
| DD[18] | 4.02 | 4.24 |

TABLE 8

Example 2

| Sn | 3 | 4 | 11 | 12 |
|---|---|---|---|---|
| KA | 1.0000000E+00 | 1.0000000E+00 | 1.0000000E+00 | 1.0000000E+00 |
| A4 | 1.2202270E−04 | 8.1987425E−05 | −5.9910307E−05 | 7.1685548E−05 |
| A6 | −1.4706841E−07 | −1.1351536E−06 | −2.7105663E−06 | −1.8161585E−06 |
| A8 | 1.5829965E−08 | 4.0398201E−08 | 1.4008559E−07 | 8.7357737E−08 |
| A10 | 1.3458109E−11 | −3.9379522E−10 | −2.4029773E−09 | −1.3148164E−09 |

EXAMPLE 3

Figure 3:
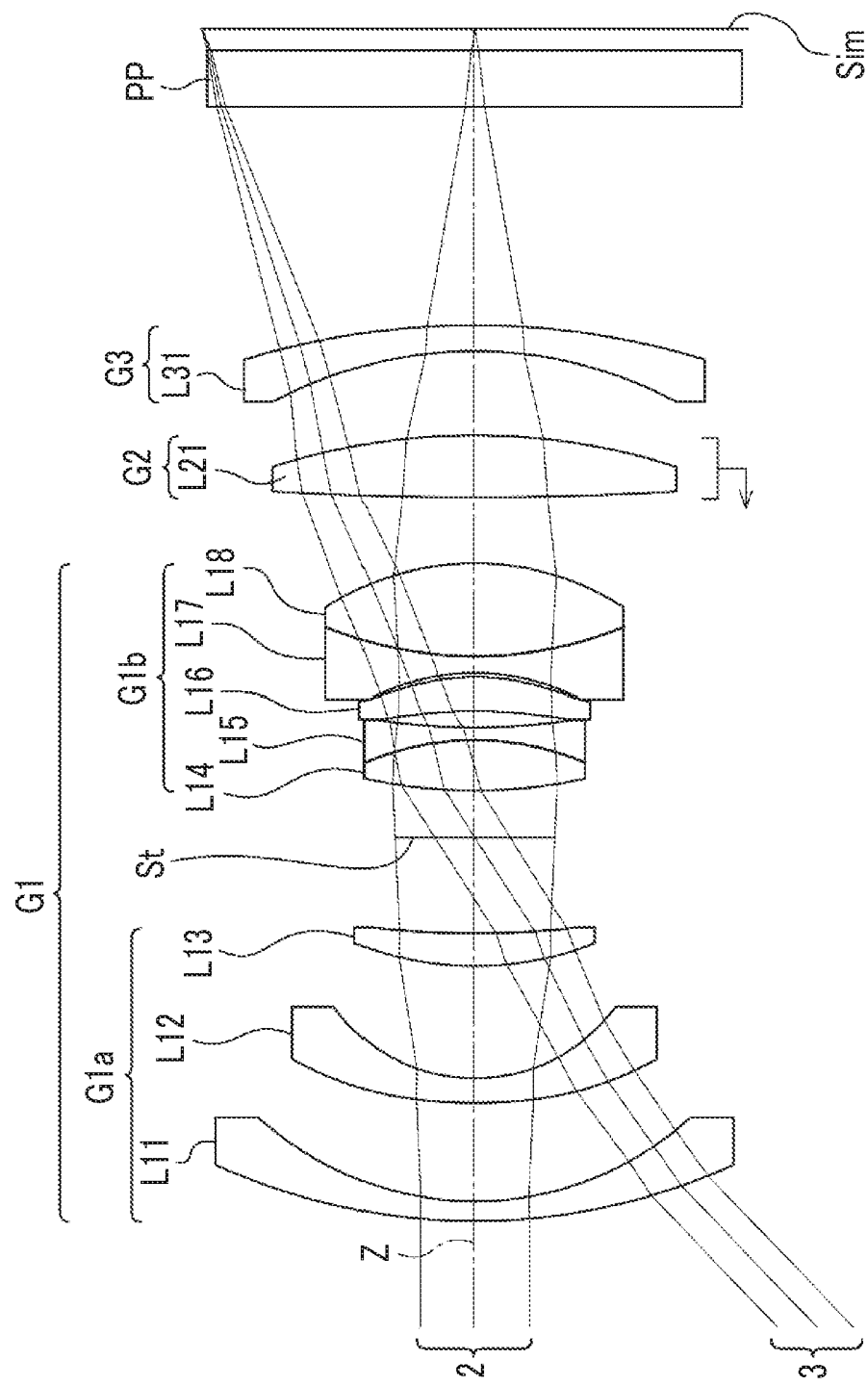
FIG. 3 is a cross-sectional view illustrating a configuration of an imaging lens of Example 3 of the present invention.
Figure 8:
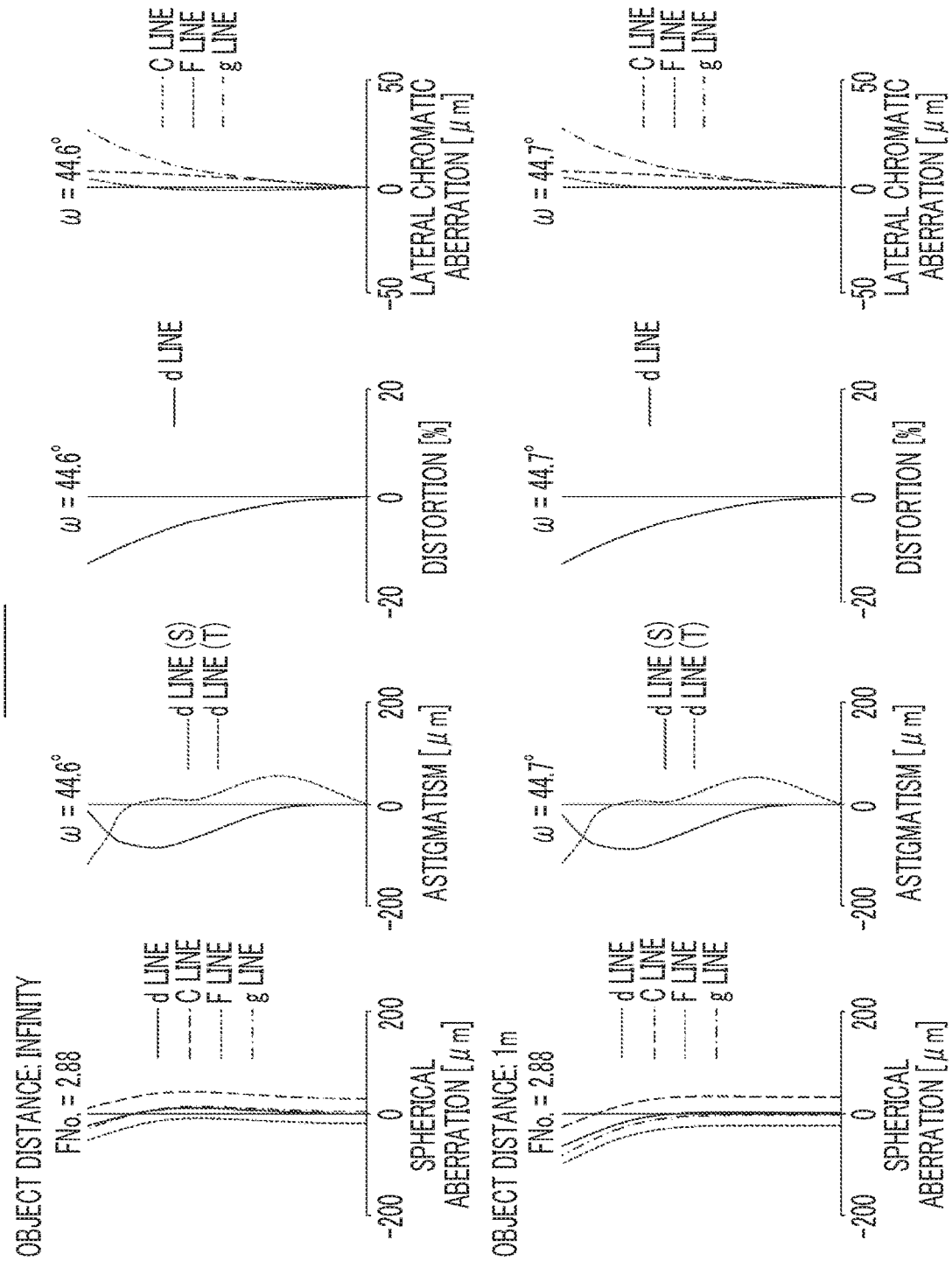
FIG. 8 is aberration diagrams of the imaging lens of Example 3 of the present invention.

FIG. 3 is a cross-sectional view illustrating a configuration of an imaging lens of Example 3. The imaging lens of Example 3 has the same configuration as the outline of the imaging lens of Example 1. Regarding the imaging lens of Example 3, Table 9 shows basic lens data, Table 10 shows specifications, Table 11 shows variable surface distances, Table 12 shows aspherical coefficients, and FIG. 8 shows each aberration diagram. In FIG. 8, aberration diagrams in a state of focusing on the object at infinity are shown in the

TABLE 5

Example 2

| Sn | R | D | Nd | vd | θgF |
|---|---|---|---|---|---|
| 1 | 29.306 | 1.00 | 1.53172 | 48.84 | 0.56309 |
| 2 | 9.320 | 5.08 | | | |
| *3 | 18.018 | 1.99 | 1.41390 | 100.82 | 0.53373 |
| *4 | 13.394 | 5.64 | | | |
| 5 | 21.065 | 1.79 | 1.71700 | 47.93 | 0.56062 |
| 6 | 59.758 | 2.49 | | | | upper row, and aberration diagrams in a state of focusing on an object at a distance of 1 m (meter) are shown in the lower row.

TABLE 9

Example 3

| Sn | R | D | Nd | vd | θgF |
|---|---|---|---|---|---|
| 1 | 33.356 | 1.00 | 1.53996 | 59.73 | 0.54432 |
| 2 | 17.010 | 5.00 | | | |
| *3 | 29.980 | 1.25 | 1.51633 | 64.06 | 0.53345 |
| *4 | 9.975 | 5.70 | | | |
| 5 | 17.372 | 1.66 | 1.72916 | 54.68 | 0.54451 |
| 6 | 48.583 | 4.86 | | | |
| 7 (St) | ∞ | 2.39 | | | |
| 8 | 27.246 | 2.56 | 2.00069 | 25.46 | 0.61364 |
| 9 | −14.909 | 0.64 | 1.72047 | 34.71 | 0.58350 |
| 10 | 33.642 | 0.83 | | | |
| *11 | −25.261 | 1.69 | 1.58313 | 59.38 | 0.54237 |
| *12 | −11.860 | 0.20 | | | |
| 13 | −12.204 | 0.85 | 1.84666 | 23.78 | 0.62054 |
| 14 | 21.022 | 4.72 | 1.72916 | 54.68 | 0.54451 |
| 15 | −14.562 | DD[15] | | | |
| 16 | 174.900 | 3.16 | 1.83481 | 42.74 | 0.56490 |
| 17 | −35.411 | DD[17] | | | |
| 18 | −22.728 | 1.32 | 1.85478 | 24.80 | 0.61232 |
| 19 | −42.023 | 11.10 | | | |
| 20 | ∞ | 2.85 | 1.51633 | 64.14 | 0.53531 |
| 21 | ∞ | 1.10 | | | |

TABLE 10

Example 3

| | |
|---|---|
| f | 16.48 |
| Bf | 14.08 |
| FNo. | 2.88 |
| 2ω(°) | 89.2 |

TABLE 11

Example 3

| | Infinity | 1 m |
|---|---|---|
| DD[15] | 3.34 | 3.10 |
| DD[17] | 4.27 | 4.51 |

TABLE 12

Example 3

| Sn | 3 | 4 | 11 | 12 |
|---|---|---|---|---|
| KA | 1.0000000E+00 | 1.0000000E+00 | 1.0000000E+00 | 1.0000000E+00 |
| A4 | 2.0475055E−04 | 2.2955992E−04 | 1.9239198E−05 | 1.4097228E−04 |
| A6 | −2.8858581E−06 | −2.8272217E−06 | 3.6727167E−07 | 5.1002854E−07 |
| A8 | 2.6924719E−08 | 2.6938117E−08 | 1.5572212E−07 | 1.3065139E−07 |
| A10 | −1.1080869E−10 | −1.4157104E−10 | −1.0598583E−09 | −2.3152786E−10 |

EXAMPLE 4

Figure 4:
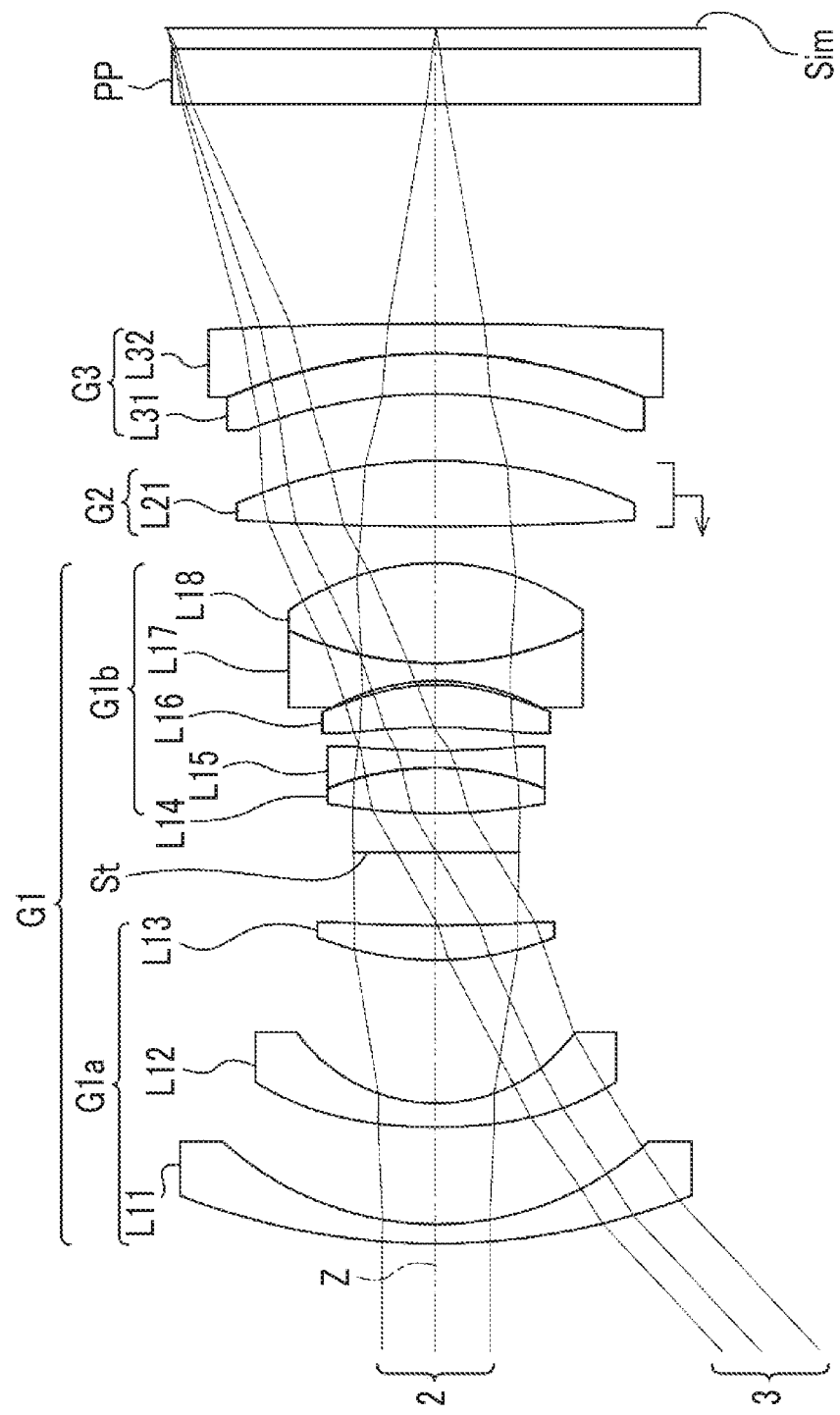
FIG. 4 is a cross-sectional view illustrating a configuration of an imaging lens of Example 4 of the present invention.
Figure 9:
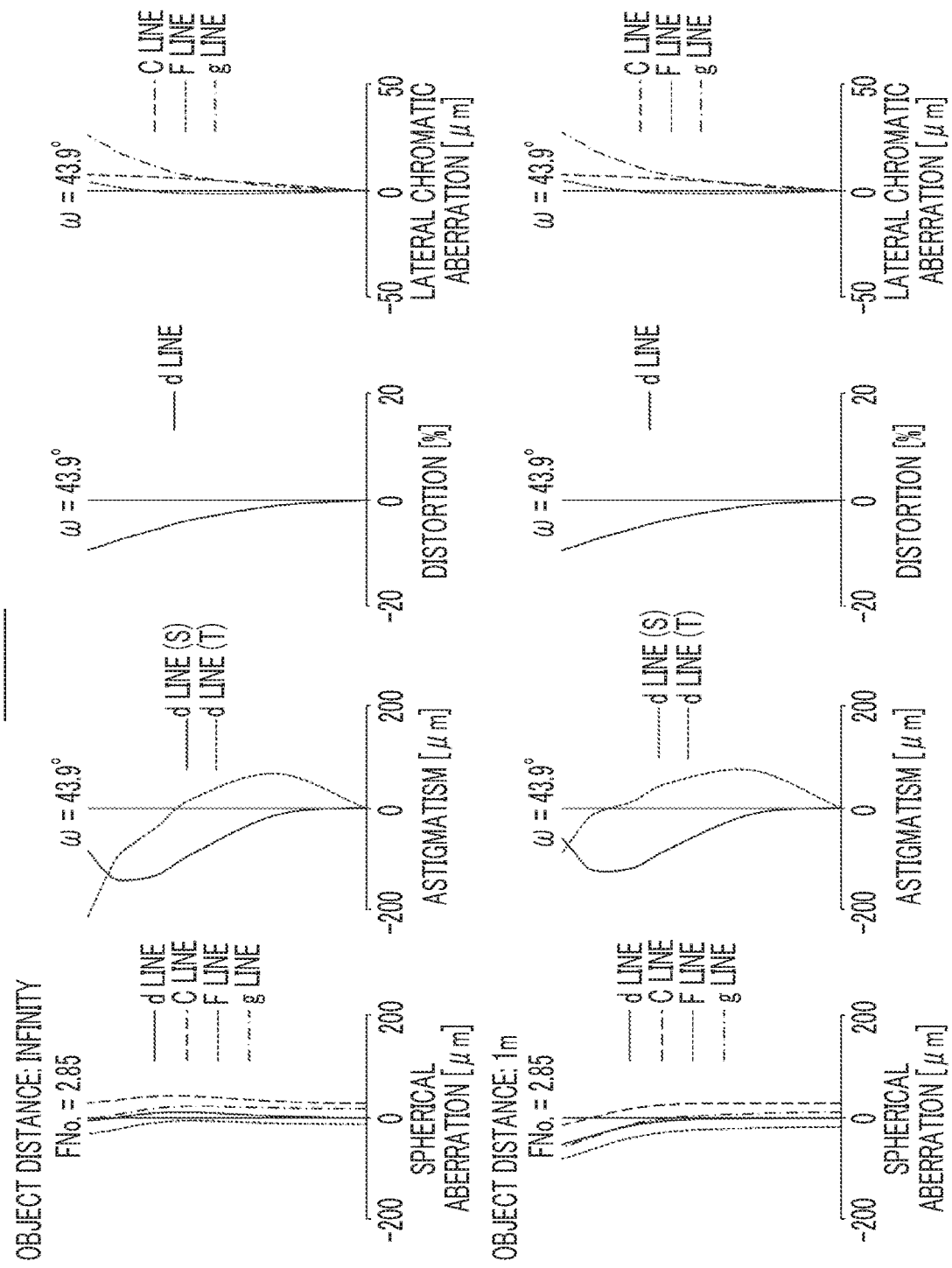
FIG. 9 is aberration diagrams of the imaging lens of Example 4 of the present invention.

FIG. 4 is a cross-sectional view illustrating a configuration of an imaging lens of Example 4. The imaging lens of Example 4 has the same configuration as the outline of the imaging lens of Example 1 except that the third lens group G3 consists of two lenses L31 and L32 in order from the object side to the image side. Regarding the imaging lens of Example 4, Table 13 shows basic lens data, Table 14 shows specifications, Table 15 shows variable surface distances, Table 16 shows aspherical coefficients, and FIG. 9 shows each aberration diagram. In FIG. 9, aberration diagrams in a state of focusing on the object at infinity are shown in the upper row, and aberration diagrams in a state of focusing on an object at a distance of 1 m (meter) are shown in the lower row.

TABLE 13

Example 4

| Sn | R | D | Nd | vd | θgF |
|---|---|---|---|---|---|
| 1 | 38.002 | 1.00 | 1.53996 | 59.46 | 0.54418 |
| 2 | 16.985 | 5.00 | | | |
| *3 | 30.003 | 1.24 | 1.51633 | 64.06 | 0.53345 |
| *4 | 9.994 | 7.32 | | | |
| 5 | 17.447 | 1.78 | 1.72916 | 54.68 | 0.54451 |
| 6 | 82.763 | 3.77 | | | |
| 7 (St) | ∞ | 2.02 | | | |
| 8 | 33.666 | 2.34 | 2.00100 | 29.13 | 0.59952 |
| 9 | −16.184 | 0.89 | 1.72916 | 54.68 | 0.54451 |
| 10 | 49.244 | 1.19 | | | |
| *11 | −36.872 | 2.20 | 1.58313 | 59.38 | 0.54237 |
| *12 | −11.650 | 0.20 | | | |
| 13 | −11.747 | 0.92 | 1.85478 | 24.80 | 0.61232 |
| 14 | 18.542 | 5.16 | 1.59522 | 67.73 | 0.54426 |
| 15 | −13.493 | DD[15] | | | |
| 16 | 169.998 | 3.38 | 1.88300 | 40.76 | 0.56679 |
| 17 | −26.271 | DD[17] | | | |
| 18 | −27.339 | 2.03 | 1.94595 | 17.98 | 0.65460 |
| 19 | −28.591 | 1.54 | 1.72047 | 34.71 | 0.58350 |
| 20 | −228.180 | 11.31 | | | |
| 21 | ∞ | 2.85 | 1.51633 | 64.14 | 0.53531 |
| 22 | ∞ | 1.08 | | | |

TABLE 14

Example 4

| | |
|---|---|
| f | 16.31 |
| Bf | 14.27 |
| FNo. | 2.85 |
| 2ω(°) | 87.8 |

TABLE 15

Example 4

| | Infinity | 1 m |
|---|---|---|
| DD[15] | 1.89 | 1.73 |
| DD[17] | 3.45 | 3.61 |

TABLE 16

| | Example 4 | | | |
|---|---|---|---|---|
| Sn | 3 | 4 | 11 | 12 |
| KA | 1.0000000E+00 | 1.0000000E+00 | 1.0000000E+00 | 1.0000000E+00 |
| A4 | 1.7810118E−04 | 1.8518681E−04 | 1.8378468E−05 | 1.5305562E−04 |
| A6 | −2.0346980E−06 | −1.8777566E−06 | −1.3460604E−07 | −2.4296996E−07 |
| A8 | 1.8047583E−08 | 1.5799399E−08 | 8.9295461E−08 | 7.3405038E−08 |
| A10 | −6.4340814E−11 | −1.1582192E−11 | −8.1424137E−10 | −3.1757218E−10 |

EXAMPLE 5

Figure 5:
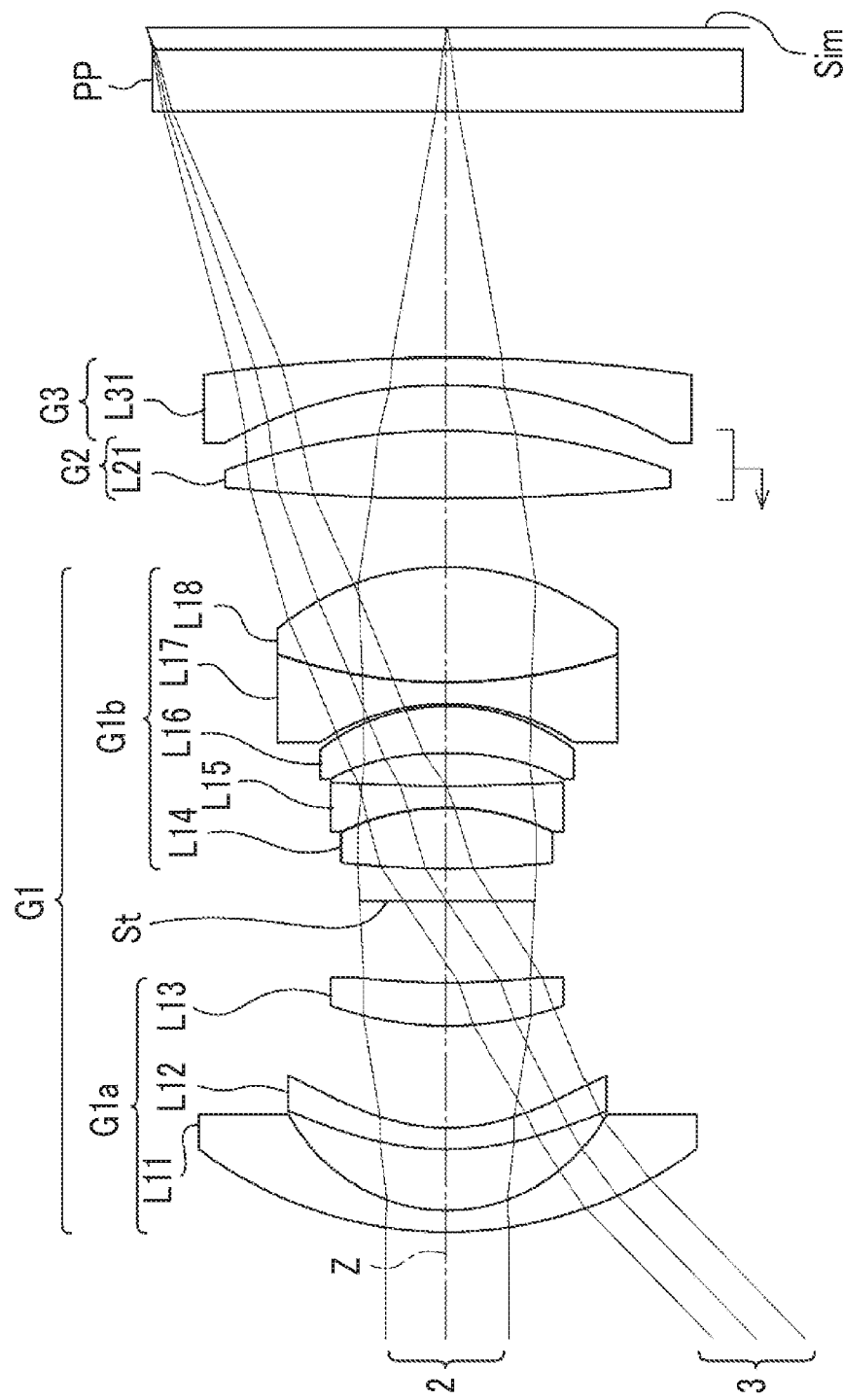
FIG. 5 is a cross-sectional view illustrating a configuration of an imaging lens of Example 5 of the present invention.
Figure 10:
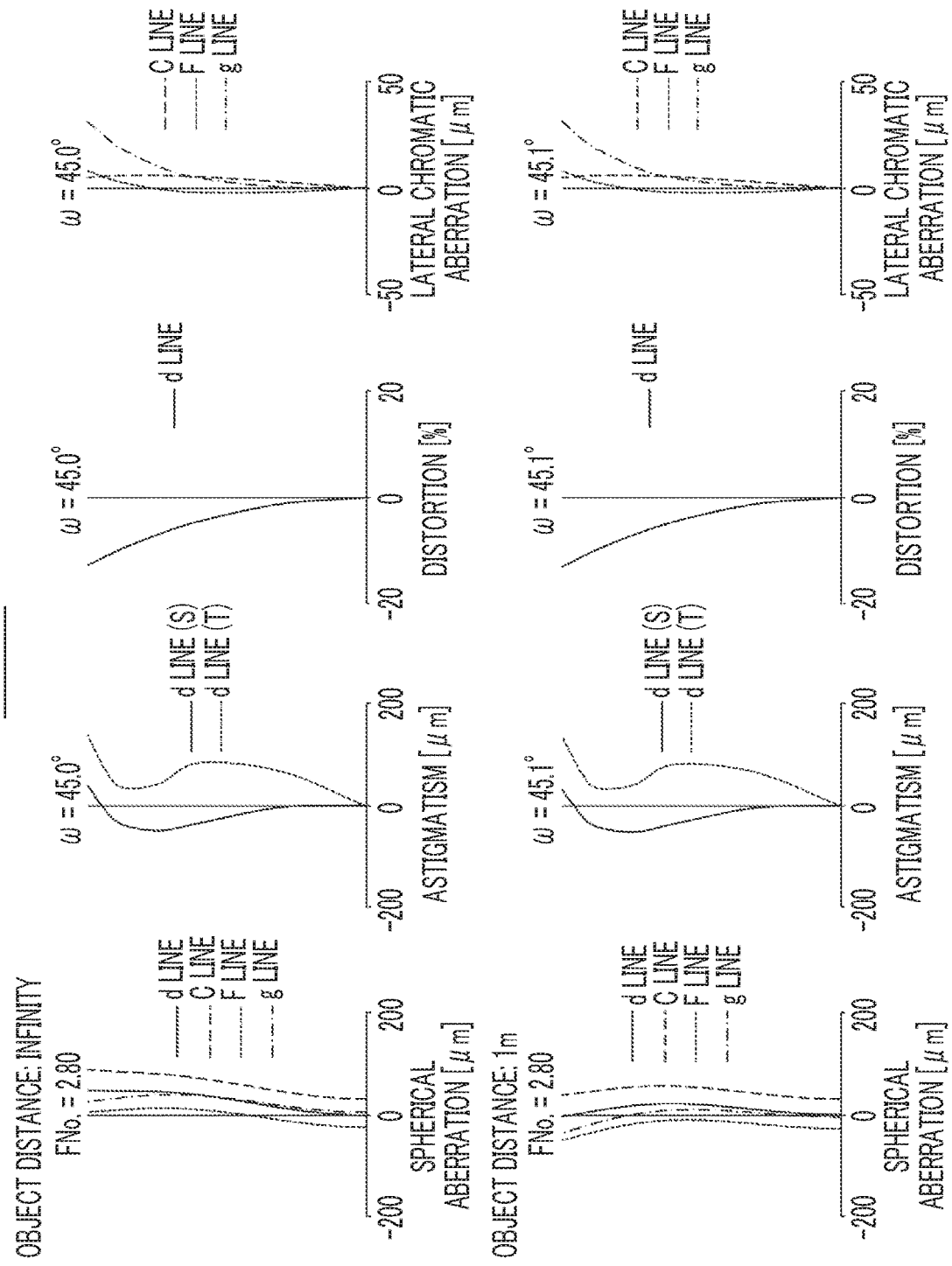
FIG. 10 is aberration diagrams of the imaging lens of Example 5 of the present invention.

FIG. 5 is a cross-sectional view illustrating a configuration of an imaging lens of Example 5. The imaging lens of Example 5 has the same configuration as the outline of the imaging lens of Example 1. Regarding the imaging lens of Example 5, Table 17 shows basic lens data, Table 18 shows specifications, Table 19 shows variable surface distances, Table 20 shows aspherical coefficients, and FIG. 10 shows each aberration diagram. In FIG. 10, aberration diagrams in a state of focusing on the object at infinity are shown in the upper row, and aberration diagrams in a state of focusing on an object at a distance of 1 m (meter) are shown in the lower row.

TABLE 17

| | Example 5 | | | | |
|---|---|---|---|---|---|
| Sn | R | D | Nd | vd | θgF |
| 1 | 20.023 | 0.99 | 1.56384 | 60.67 | 0.54030 |
| 2 | 8.570 | 2.81 | | | |
| *3 | 13.741 | 1.00 | 1.51633 | 64.06 | 0.53345 |
| *4 | 9.846 | 4.64 | | | |
| 5 | 16.783 | 1.99 | 1.74100 | 52.64 | 0.54676 |
| 6 | 41.279 | 3.75 | | | |
| 7 (St) | ∞ | 1.50 | | | |
| 8 | 49.014 | 2.79 | 1.88300 | 39.22 | 0.57295 |
| 9 | −11.838 | 1.01 | 1.54814 | 45.78 | 0.56859 |
| 10 | 88.794 | 1.51 | | | |
| *11 | −16.370 | 2.16 | 1.58313 | 59.38 | 0.54237 |
| 12 | −10.027 | 0.11 | | | |
| 13 | −11.061 | 0.99 | 1.68893 | 31.07 | 0.60041 |
| 14 | 25.915 | 5.30 | 1.64000 | 60.08 | 0.53704 |
| 15 | −12.695 | DD[15] | | | |
| 16 | 111.029 | 3.11 | 1.65160 | 58.55 | 0.54267 |
| 17 | −31.109 | DD[17] | | | |
| 18 | −22.014 | 1.24 | 1.71736 | 29.52 | 0.60483 |
| 19 | −85.882 | 11.31 | | | |
| 20 | ∞ | 2.85 | 1.51633 | 64.14 | 0.53531 |
| 21 | ∞ | 0.99 | | | |

TABLE 18

| Example 5 | |
|---|---|
| f | 16.33 |
| Bf | 14.18 |

TABLE 18-continued

| Example 5 | |
|---|---|
| FNo. | 2.80 |
| 2ω(°) | 90.0 |

TABLE 19

| | Example 5 | |
|---|---|---|
| | Infinity | 1 m |
| DD[15] | 3.16 | 2.92 |
| DD[17] | 2.11 | 2.35 |

TABLE 20

| | Example 5 | | |
|---|---|---|---|
| Sn | 3 | 4 | 11 |
| KA | 1.0000000E+00 | 1.0000000E+00 | 1.0000000E+00 |
| A4 | −1.7325805E−04 | −2.4963089E−04 | −2.1752532E−04 |
| A6 | 1.6383675E−06 | 3.4939765E−08 | −8.7320227E−07 |
| A8 | −1.9275738E−08 | −9.4399118E−09 | −2.5027984E−08 |
| A10 | −1.1710974E−11 | −3.7275476E−10 | 3.1036295E−11 |

Table 21 shows values corresponding to Conditional Expressions (1) to (13) of the imaging lenses of Examples 1 to 5. In the rows of the Conditional Expression (6), the upper row shows values regarding the cemented lens on the most object side in the first lens group G1, and the lower row shows values regarding the cemented lens positioned second from the object side in the first lens group G1. Likewise, in the rows of the Conditional Expression (7), the upper row shows values regarding the cemented lens on the most object side in the first lens group G1, and the lower row shows values regarding the cemented lens positioned second from the object side in the first lens group G1. In Examples 1 to 5, the d line is set as the reference wavelength. Table 21 shows the values based on the d line.

TABLE 21

| Expression Number | | Example 1 | Example 2 | Example 3 | Example 4 | Example 5 |
|---|---|---|---|---|---|---|
| (1) | f/f2 | 0.40 | 0.46 | 0.46 | 0.63 | 0.43 |
| (2) | f1/f1a | 0.19 | −0.34 | −0.36 | −0.16 | −0.33 |
| (3) | f1/f1b | 0.59 | 0.82 | 0.88 | 0.76 | 0.86 |
| (4) | N1bp | 2.00069 | 2.00069 | 2.00069 | 2.00100 | 1.88300 |
| (5) | v1bp − v1bn | −42.27 | −33.09 | −29.22 | −38.60 | −20.86 |

TABLE 21-continued

| Expression Number | | Example 1 | Example 2 | Example 3 | Example 4 | Example 5 |
|---|---|---|---|---|---|---|
| (6) | $0.0018 \times vp + \theta gFp$ | 0.659 | 0.659 | 0.659 | 0.652 | 0.644 |
| | | 0.666 | 0.648 | 0.643 | 0.666 | 0.645 |
| (7) | $0.0018 \times vn + \theta gFn$ | 0.645 | 0.646 | 0.646 | 0.643 | 0.651 |
| | | 0.662 | 0.662 | 0.663 | 0.657 | 0.656 |
| (8) | f/f1 | 0.87 | 0.75 | 0.69 | 0.58 | 0.88 |
| (9) | DG1/f | 2.04 | 2.01 | 2.02 | 2.15 | 1.87 |
| (10) | f/f3 | −0.36 | −0.34 | −0.28 | −0.38 | −0.39 |
| (11) | $DS/(f \times \tan(\omega))$ | 2.57 | 2.61 | 2.46 | 2.64 | 2.40 |
| (12) | $TL/(f \times \tan(\omega))$ | 3.76 | 3.72 | 3.66 | 3.92 | 3.33 |
| (13) | $Bf/(f \times \tan(\omega))$ | 0.87 | 0.88 | 0.87 | 0.91 | 0.87 |

As can be seen from the above data, the imaging lenses of Examples 1 to 5 have a configuration capable of achieving miniaturization and high-speed focusing and being advantageous for securing a peripheral light amount, and realize high optical performance over the entire photographing distance in which various aberrations including astigmatism and distortion are favorably suppressed while the imaging lens has a wide angle in which a total angle of view is 85 degrees or more.

Figure 11:
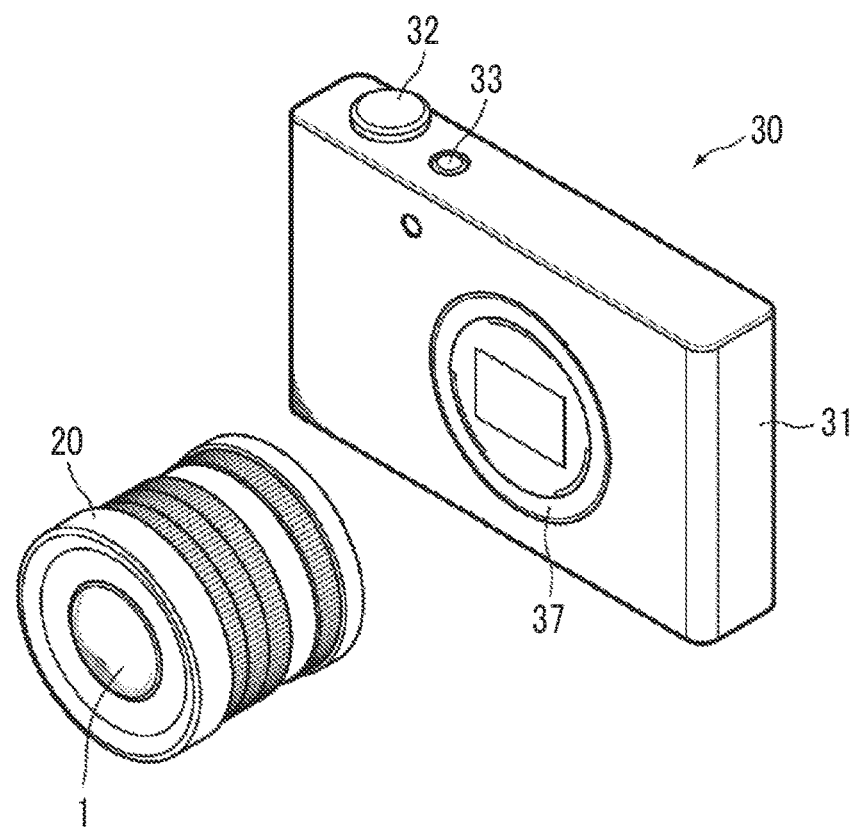
FIG. 11 is a perspective view of a front side of an imaging apparatus according to an embodiment of the present invention.
Figure 12:
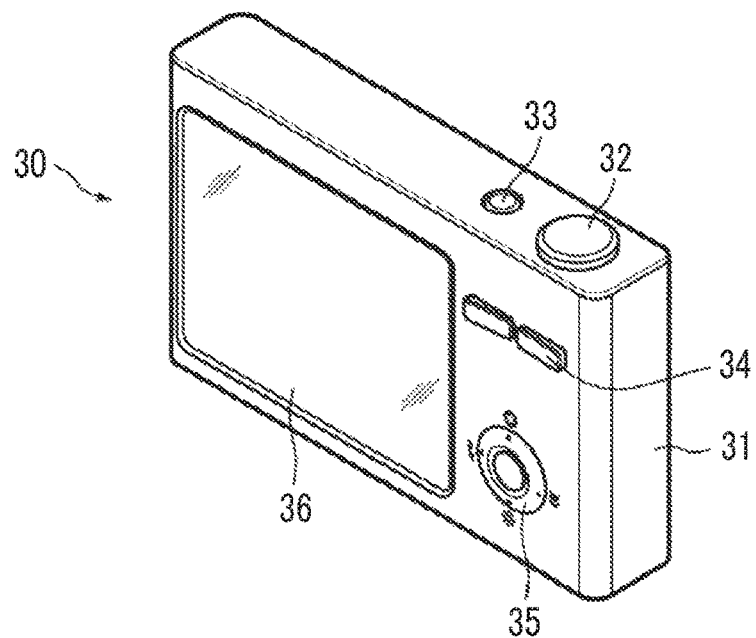
FIG. 12 is a perspective view of a rear side of the imaging apparatus according to the embodiment of the present invention.

Next, an imaging apparatus according to an embodiment of the present invention is described. FIGS. 11 and 12 are external views of a camera 30 which is an imaging apparatus according to the embodiment of the present invention. FIG. 11 is a perspective view of the camera 30 viewed from the front side, and FIG. 12 is a perspective view of the camera 30 viewed from the rear side. The camera 30 is a mirrorless type digital camera in which an interchangeable lens 20 is attachably and detachably mounted. The interchangeable lens 20 is configured to include an imaging lens 1 according to the embodiment of the present invention which is housed in a lens barrel.

The camera 30 includes a camera body 31, and a shutter button 32 and a power button 33 are provided on an upper surface of the camera body 31. Further, operation sections 34 and 35 and a display section 36 are provided on a rear surface of the camera body 31. The display section 36 displays a captured image and an image within an angle of view before imaging.

An imaging aperture through which light from an imaging target is incident is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element such as a charge coupled device (CCD) or a complementary metal oxide semiconductor (CMOS), which outputs a captured image signal based on a subject image formed through the interchangeable lens 20, a signal processing circuit which generates an image through processing of the captured image signal output from the imaging element, a recording medium which records the generated image, and the like. The camera 30 can capture a still image or a moving image by pressing the shutter button 32, and store image data, which is obtained through imaging, in the recording medium.

The present invention has been hitherto described through embodiments and examples, but the present invention is not limited to the above-mentioned embodiments and examples, and may be modified into various forms. For example, values of the radius of curvature, the surface distance, the refractive index, the Abbe number, and the aspherical coefficient of each lens are not limited to the values shown in the numerical examples, and different values may be used therefor.

The imaging apparatus according to the embodiment of the present invention is not also limited to the above mentioned examples. For the imaging apparatus, various aspects such as cameras other than the mirrorless type, film cameras, and video cameras can be employed.

What is claimed is:

1. An imaging lens consisting of, in order from an object side to an image side:
    a first lens group having a positive refractive power;
    a second lens group having a positive refractive power; and
    a third lens group having a negative refractive power,
    wherein, during focusing from an object at infinity to a closest object, the first lens group and the third lens group are fixed with respect to an image plane and the second lens group moves along an optical axis,
    the first lens group consists of, in order from the object side to the image side, a first a lens group, a stop, and a first b lens group,
    a lens on the most object side of the first a lens group is a negative lens of which a surface on the object side is a convex surface,
    the number of lenses included in the second lens group is two or less,
    a lens surface on the most image side of the third lens group is a convex surface, and
    assuming that a focal length of the imaging lens in a state of focusing on the object at infinity is f, a focal length of the second lens group is f2, a focal length of the first lens group is f1, a focal length of the first a lens group is f1a, and a focal length of the first b lens group is f1b, Conditional Expressions (1-1), (2) and (3) are satisfied, which are represented by $$0.35 < f/f2 < 0.65 \qquad (1\text{-}1)$$

$$-0.5 < f1/f1a < 0.3 \qquad (2)$$

$$0.4 < f1/f1b < 0.95 \qquad (3).$$

2. The imaging lens according to claim 1, wherein the first lens group includes at least one cemented lens obtained by cementing at least one positive lens and at least one negative lens.

3. The imaging lens according to claim 2,
    wherein the at least one cemented lens is disposed in the first b lens group, and
    the cemented lens on the most object side in the first b lens group is obtained by cementing a positive lens and a negative lens in order from the object side.

4. The imaging lens according to claim 3,
wherein, assuming that a refractive index of the positive lens composing the cemented lens on the most object side in the first b lens group with respect to a d line is N1bp, Conditional Expression (4) is satisfied, which is represented by $$1.8 < N1bp < 2.1 \tag{4}$$

5. The imaging lens according to claim 3,
wherein, assuming that an Abbe number of the positive lens composing the cemented lens on the most object side in the first b lens group based on a d line is v1bp, and an Abbe number of the negative lens composing the cemented lens on the most object side in the first b lens group based on the d line is v1bn, Conditional Expression (5) is satisfied, which is represented by $$-50 < v1bp - v1bn < 0 \tag{5}$$

6. The imaging lens according to claim 5,
wherein Conditional Expression (5-1) is satisfied, which is represented by $$-40 < v1bp - v1bn < -5 \tag{5-1}$$

7. The imaging lens according to claim 2, wherein the first lens group includes two cemented lenses.

8. The imaging lens according to claim 7,
wherein the two cemented lenses are disposed in the first b lens group,
the cemented lens on the most object side in the first b lens group is obtained by cementing a positive lens and a negative lens in order from the object side, and
the cemented lens positioned second from the object side in the first b lens group is obtained by cementing a negative lens and a positive lens in order from the object side.

9. The imaging lens according to claim 2,
wherein, assuming that an Abbe number of the positive lens composing the cemented lens based on a d line is vp, a partial dispersion ratio between a g line and a F line of the positive lens composing the cemented lens is θgFp, an Abbe number of the negative lens composing the cemented lens based on the d line is vn, and a partial dispersion ratio between the g line and the F line of the negative lens composing the cemented lens is θgFn, the at least one cemented lens is obtained by cementing at least one positive lens and at least one negative lens respectively satisfying Conditional Expressions (6) and (7), which are represented by $$0.645 < 0.0018 \times vp + \theta gFp < 0.72 \tag{6}$$

$$0.645 < 0.0018 \times vn + \theta gFn < 0.72 \tag{7}$$

10. The imaging lens according to claim 1,
wherein, assuming that a distance on the optical axis between a lens surface on the most object side of the first lens group and a lens surface on the most image side of the first lens group is DG1, Conditional Expression (9) is satisfied, which is represented by $$1.6 < DG1/f < 2.5 \tag{9}$$

11. The imaging lens according to claim 1,
wherein, assuming that a focal length of the third lens group is f3, Conditional Expression (10) is satisfied, which is represented by $$-0.8 < f/f3 < -0.05 \tag{10}$$

12. The imaging lens according to claim 11,
wherein Conditional Expression (10-1) is satisfied, which is represented by $$-0.5 < f/f3 < -0.2 \tag{10-1}$$

13. The imaging lens according to claim 1,
wherein the number of lenses included in the third lens group is two or less.

14. The imaging lens according to claim 1,
wherein Conditional Expression (2-1) is satisfied, which is represented by $$-0.4 < f1/f1a < 0.22 \tag{2-1}$$

15. The imaging lens according to claim 1,
wherein Conditional Expression (3-1) is satisfied, which is represented by $$0.5 < f1/f1b < 0.9 \tag{3-1}$$

16. An imaging apparatus comprising the imaging lens according to claim 1.

17. An imaging lens consisting of, in order from an object side to an image side:
a first lens group having a positive refractive power;
a second lens group having a positive refractive power; and
a third lens group having a negative refractive power,
wherein, during focusing from an object at infinity to a closest object, the first lens group and the third lens group are fixed with respect to an image plane and the second lens group moves along an optical axis,
the first lens group consists of, in order from the object side to the image side, a first a lens group, a stop, and a first b lens group,
a lens on the most object side of the first a lens group is a negative lens of which a surface on the object side is a convex surface,
the number of lenses included in the second lens group is two or less,
a lens surface on the most image side of the third lens group is a convex surface, and
assuming that a focal length of the imaging lens in a state of focusing on the object at infinity is f, a focal length of the second lens group is f2, a focal length of the first lens group is f1, a focal length of the first a lens group is f1a, and a focal length of the first b lens group is f1b, Conditional Expressions (1), (2), (3), and (8) are satisfied, which are represented by $$0.35 < f/f2 < 0.75 \tag{1}$$

$$-0.5 < f1/f1a < 0.3 \tag{2}$$

$$0.4 < f1/f1b < 0.95 \tag{3}$$

$$0.4 < f/f1 < 1 \tag{8}$$

18. The imaging lens according to claim 17,
wherein Conditional Expression (8-1) is satisfied, which is represented by $$0.5 < f/f1 < 1 \tag{8-1}$$

19. An imaging apparatus comprising the imaging lens according to claim 17.

20. An imaging lens consisting of, in order from an object side to an image side:
a first lens group having a positive refractive power;
a second lens group having a positive refractive power; and
a third lens group having a negative refractive power, wherein, during focusing from an object at infinity to a closest object, the first lens group and the third lens group are fixed with respect to an image plane and the second lens group moves along an optical axis, the first lens group consists of, in order from the object side to the image side, a first a lens group, a stop, and a first b lens group, a lens on the most object side of the first a lens group is a negative lens of which a surface on the object side is a convex surface, the number of lenses included in the second lens group is two or less, a lens surface on the most image side of the third lens group is a convex surface, assuming that a focal length of the imaging lens in a state of focusing on the object at infinity is f, a focal length of the second lens group is f2, a focal length of the first lens group is f1, a focal length of the first a lens group is f1a, and a focal length of the first b lens group is f1b, Conditional Expressions (1), (2) and (3) are satisfied, which are represented by $$0.35 < f/f2 < 0.75 \quad (1)$$

$$-0.5 < f1/f1a < 0.3 \quad (2)$$

$$0.4 < f1/f1b < 0.95 \quad (3), \text{ and}$$

assuming that a sum of a distance on the optical axis from the stop to a lens surface on the most image side of the third lens group and an air equivalent distance on the optical axis from the lens surface on the most image side of the third lens group to a focus position on the image side of the imaging lens in a state of focusing on the object at infinity is DS, and a maximal half angle of view is $\omega$, Conditional Expression (11) is satisfied, which is represented by $$2 < DS/(f \times \tan(\omega)) < 2.85 \quad (11).$$

21. An imaging apparatus comprising the imaging lens according to claim 20.

* * * * *